(12) United States Patent
McCollum

(10) Patent No.: US 8,347,514 B1
(45) Date of Patent: Jan. 8, 2013

(54) POWER LINE TOWER ALIGNMENT JIG

(75) Inventor: Robert McCollum, Grass Valley, CA (US)

(73) Assignee: KV Structures, Inc., Cedar Ridge, CA (US)

( * ) Notice: Subject to any disclaimer, the term of this patent is extended or adjusted under 35 U.S.C. 154(b) by 71 days.

(21) Appl. No.: 12/785,542

(22) Filed: May 24, 2010

(51) Int. Cl.
G01B 3/30 (2006.01)
G01B 5/25 (2006.01)

(52) U.S. Cl. .............................. 33/1 G; 33/613; 33/562
(58) Field of Classification Search .................... 33/1 G, 33/613, 562
See application file for complete search history.

(56) References Cited

U.S. PATENT DOCUMENTS

| 422,104 | A | * | 2/1890 | Yount | 33/613 |
| 3,888,477 | A | * | 6/1975 | Tate | 269/82 |
| 4,357,755 | A | * | 11/1982 | Allen et al. | 33/518 |
| 5,937,531 | A | * | 8/1999 | Menk et al. | 33/613 |
| 5,979,068 | A | * | 11/1999 | Andrews | 33/520 |
| 6,658,753 | B2 | * | 12/2003 | Tatarnic | 33/613 |
| 7,069,659 | B1 | * | 7/2006 | Rye | 33/194 |
| 7,487,597 | B2 | * | 2/2009 | Diaz | 33/562 |
| 7,861,434 | B2 | * | 1/2011 | Knudsen | 33/613 |
| 7,946,052 | B2 | * | 5/2011 | Stevens | 33/645 |
| 7,979,997 | B2 | * | 7/2011 | Pianetto | 33/613 |

* cited by examiner

Primary Examiner — Christopher Fulton
(74) Attorney, Agent, or Firm — John P. O'Banion

(57) ABSTRACT

An alignment jig uses steel alignment cross members and chords to align multiple load bearing member footing legs simultaneously with great accuracy, thereby greatly speeding construction footing installation times. Using preset adjustment stops, multiple footing patterns may be readily accommodated. The entire alignment jig may be readily assembled or prepared for transport by skilled workers in an hour or less. By using the alignment jig, the speed of footing construction may be greatly increased. In some cases, footings that would have previously required four days to a week to build were reduced to a single day, with consequent cost and time savings. Although one initial use of the alignment jig is for high voltage power line tower footings with four legs, it may be used with as few as two legs, and may be used with more than four legs, and in a variety of applications.

20 Claims, 21 Drawing Sheets

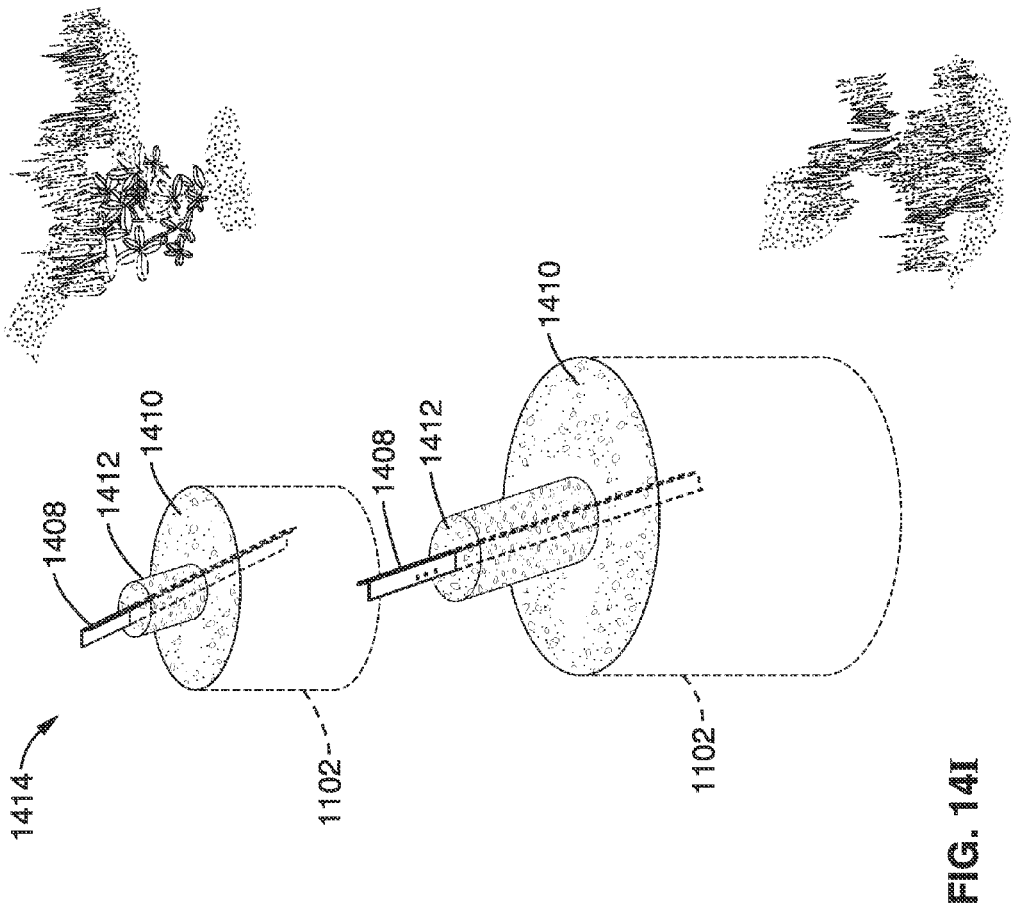
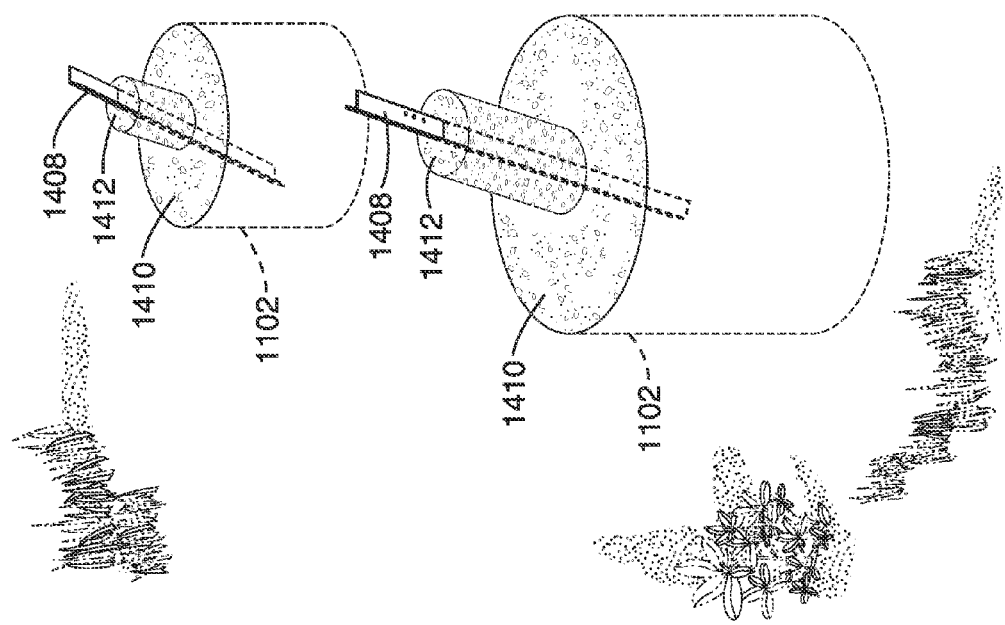
FIG. 14I

POWER LINE TOWER ALIGNMENT JIG

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

This invention pertains generally to footing placement, more particularly to tower footing placement, and still more particularly to tower footing placement for high voltage power lines. Traditional power line tower footings are installed by positioning one concrete form at a time, independently of the other footing locations.

BRIEF SUMMARY OF THE INVENTION

An aspect of the invention is an alignment jig that may comprise: a hub; and means for placing one or more load bearing members in prescribed orientations. Typical load bearing members may be, without limitation, steel angle beams. The means for placing may comprise one or more spider arms with a hub end and a shoe end; wherein the spider arms are connected to the hub at the hub ends.

The means for placing may comprise a spider arm adjustment that attaches to each spider arm at the shoe end; and a shoe attached to the spider arm adjustment.

In the description above, the spider arm adjustment allows for a plurality of overall length adjustments of a shoe to hub distance, thereby allowing for a corresponding plurality of jig placement patterns.

The means for placing may comprise one or more chords with a connection point at each of two chord ends; wherein the chords are connected to the shoe by attachment of one connection point to one shoe at both chord ends.

There may be four spider arms corresponding with four spider arm adjustments. There may also be four chords. The chords may be retractable on at least one end.

In the description above, the spider arm adjustments may be retractable. Both spider arm adjustments and chords may be adjustable to one or more preset lengths.

The means for placing described above may comprise a tower removably attached to the hub. The means for placing may also comprise one rope segment forming a tensile connection between the tower and each spider arm.

Another aspect of the invention is an alignment jig, which may comprise: a hub; four spider arms, each spider arm comprising: a hub end and a shoe end; wherein each hub end is removably attached to the hub; a spider arm adjustment slidably connected on each spider arm at one or more preset lengths; a shoe attached to an end of the spider arm adjustment, wherein the shoe allows for placement of a tower leg; four chords, each chord comprising: a connection point at each of two chord ends; wherein the chords are connected to the spider arms by attachment of one connection point to one shoe at each of both chord ends; whereby each shoe end is thereby connected to two different chords.

A tower may be attached to a top side of the hub; and at least one rope segment connecting each spider arm to the tower in tension.

The alignment jig described above may further comprise one spider arm adjustment attachment tab disposed on each spider arm adjustment; and one footing form attachment tab, removably connected to one spider arm adjustment attachment tab.

The alignment jig may comprise: a chair, comprising: three legs joining at a chair seat; a threaded section threadedly disposed on the chair seat; a conical taper disposed atop the threaded section distal from the chair seat; and a central conical alignment receptacle disposed on the hub, whereby the conical taper mates with the central conical alignment receptacle.

A still further aspect of the invention is a method of aligning tower legs, which may comprise: providing a survey marker at a surveyed reference location; leveling a circular region about the survey marker; placing a circular plate about the surveyed marker, the circular plate comprising an opening whereby the surveyed marker may be viewed; placing a chair atop the circular plate, the chair comprising: three legs joining at a chair seat; a threaded section threadedly disposed on the chair seat; a conical taper disposed atop the threaded section above the chair seat; providing an alignment jig, comprising: a central conical alignment receptacle disposed on a hub, whereby the central conical taper mates with the central taper, whereby the alignment jig may be vertically spaced above the surveyed reference location at a specified elevation, and whereby the alignment jig is centered vertically above the survey marker.

The alignment jig described above may comprise: two or more spider arms attached to the hub; a spider arm adjustment attached to each spider arm, terminating in a shoe attached to the spider arm adjustment; one or more chords with a connection point at each of two chord ends; wherein the chords are connected to two shoes by attachment of one connection point to one shoe at both chord ends.

The method of aligning tower legs described above may comprise: drilling footing holes; hoisting the alignment jig; placing the alignment jig central conical alignment receptacle vertically atop the alignment jig chair conical taper; vertically adjusting the alignment jig elevation by treaded adjustment of the chair threaded section; rotating the alignment jig to a prescribed orientation; attaching a concrete form can, comprising a footing form attachment tab, to each spider arm adjustment attachment tab disposed on each spider arm adjustment; then attaching a load bearing member to each shoe; and pouring concrete in the footing holes; then pouring concrete in the concrete form cans.

The method of aligning tower legs described above may comprise: waiting for a time for the concrete in the footing holes and concrete form cans to allow for sufficient hardening of the concrete; retracting the spider arm adjustment into each spider arm; retracting or removing the chords; and then hoisting the alignment jig away for further use.

The method of aligning tower legs above may further comprise erecting a tower onto the load bearing members. Finally, for an electrical tower, electrical lines may be attached to the tower for electrical power transmission.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 14I is a perspective view where the alignment jig and the concrete form cans of FIG. 14H have been removed, leaving the concrete previously poured in the concrete form cans surrounding load bearing members, where concrete has been poured into the footing holes of FIG. 14B to form a tower footing.

DETAILED DESCRIPTION OF THE INVENTION

For clarity and ease of comprehension of this invention, the individual components will first be described, and then assembled to show their grouped functionality. Finally, the overall process of shipping, assembling, and using the alignment jig will be shown.

Alignment Jig Individual Major Components

Figure 1A:
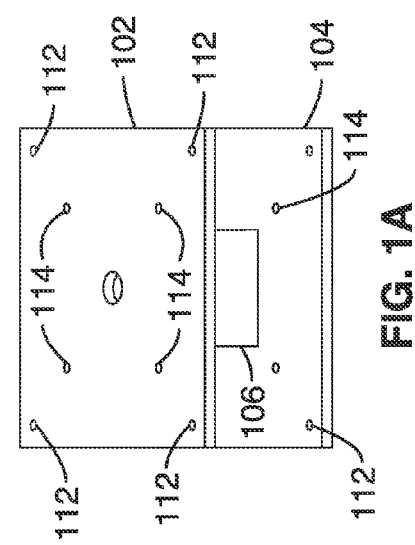
FIG. 1A is a perspective top view of the alignment jig hub.

FIG. 1A is a perspective top view of an alignment jig hub 100, which initially comprises an upper hub plate 102, and a lower hub plate 104. These upper and lower hub plates, respectively 102 and 104, due to the demands of stresses placed upon them, and the requirement that dimensional stability be retained, may range from 12 mm to 18 mm (or more) in thickness of steel plating, or other rigid material. The upper hub plate 102 and a lower hub plate 104 are spaced apart, and attached to each other via a welded box section 106 therebetween. The welded box section 106 may be comprised of separate wall sections, but may more readily be comprised simply of a short section of square cross-section box beam. In one embodiment, this would be a 6"×6"×¼" box beam section.

Figure 1B:
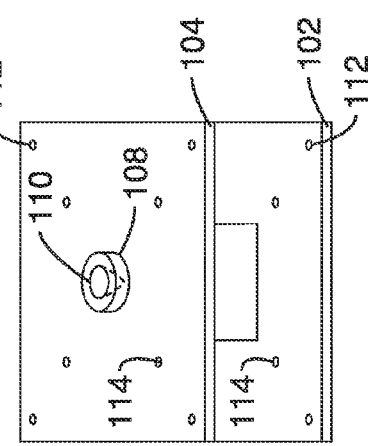
FIG. 1B is a perspective bottom view of the alignment jig hub of FIG. 1A.

FIG. 1B is a bottom perspective view of the same alignment jig hub 100 of FIG. 1A, which comprises an upper hub plate 102 (now shown on the bottom), and a lower hub plate 104 (now shown on the top). It is noted here, however, that the lower hub plate 104 has a central alignment feature 108 with a central conical alignment receptacle 110. This central conical alignment receptacle 110 functions to locate the alignment jig hub 100, and all other attached structures, in proper position so as to align two or more concrete form cans in accurate locations. This function will become more apparent as the entire alignment jig is described further below.

Referring now to both FIG. 1A and FIG. 1B, one finds eight sets of holes 112 radially distributed about the centers of the upper and lower hub plates 102 and 104, which serve as attachment points to the alignment jig hub 100. Mounting through holes 114 provide attachment for subsequent components.

Figure 2:
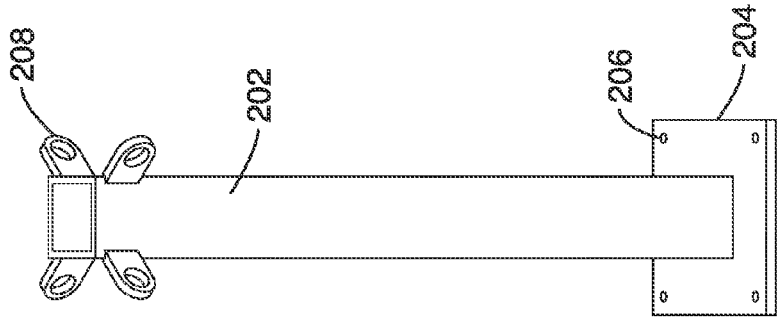
FIG. 2 is a perspective view of a tower.

FIG. 2 is a perspective view of a tower 200. The tower 200 has a central tower shaft 202, which vertically rises from a tower base 204. The tower base 204 has one or more attachment through holes 206 (here, four such holes are shown) to allow for removable mounting of the tower 200. Near the top of the central tower shaft 202 are one or more (and typically 4) "pad-eye" anchors 208. The "pad-eye" anchors 208 are designed for welded attachment, and allow for significant loading stresses.

Figure 3:
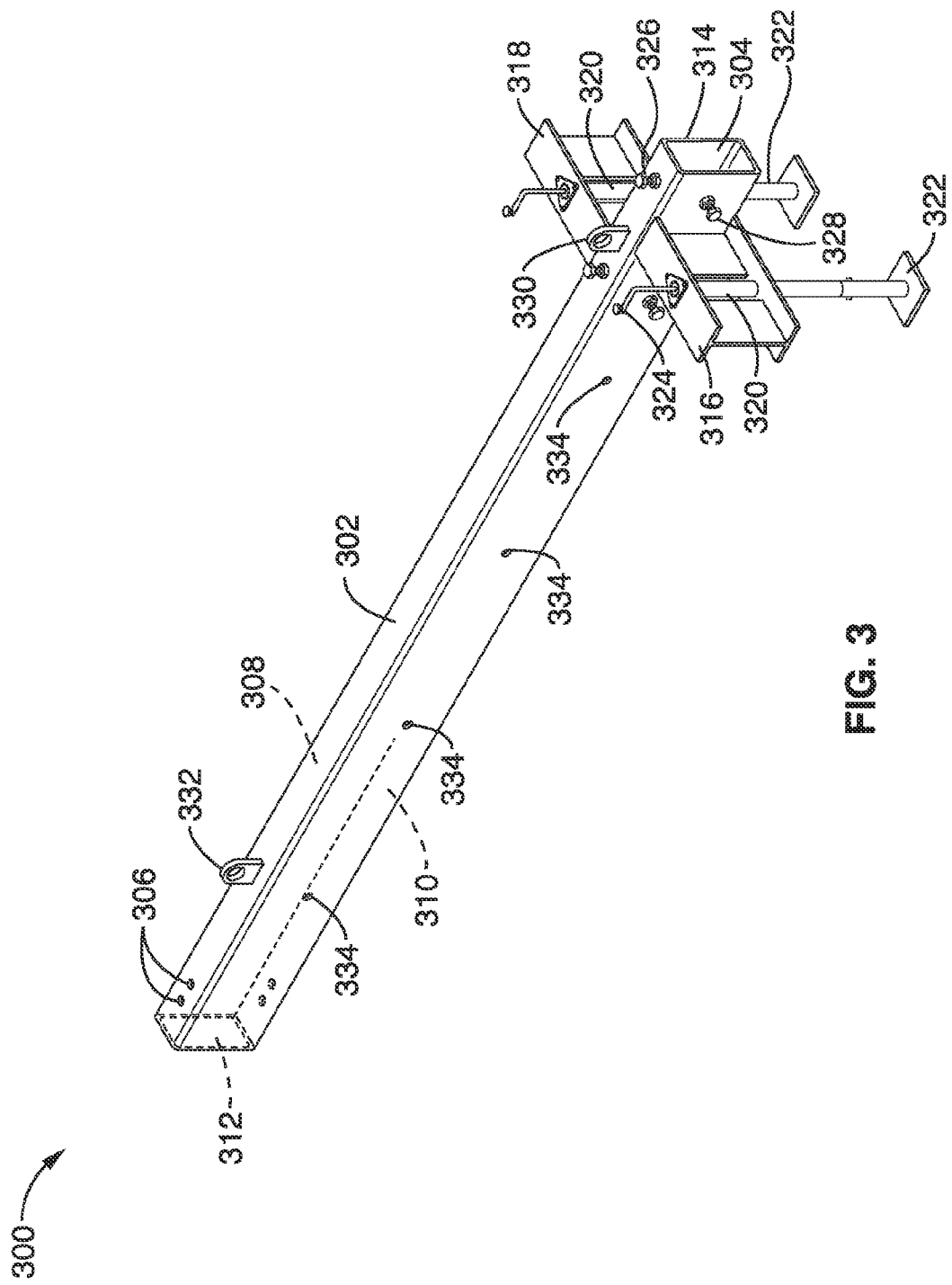
FIG. 3 is a perspective view of a spider arm.

FIG. 3 shows a single spider arm 300. The spider arm 300 typically comprises a steel rectangular box beam 302, having a hollow central region 304. At one end of the rectangular box beam 302 are hub attachment points 306, which appear both on the top 308 and bottom 310 of the rectangular box beam 302. For simplicity, one would refer to the end having the hub attachment holes 306 as the "hub end" 312, with the other end as the "shoe end" 314.

Near the "shoe end" 314 of the steel rectangular box beam 302 appears at least one jack arm 316. Two such jack arms 316 may be directly spaced apart across the width of the steel rectangular box beam 302, or they may be offset as shown here to facilitate shipping. In this embodiment shown in FIG. 3, a second offset jack arm 318 is shown. Through each jack arm 316 and 318 is removably mounted a screw jack 320 having a jack stand 322 capable of raising and lowering the jack arm 316 via turning of a jack handle 324, and thereby capable of raising and lowering anything attached to the spider arm 300.

The jack arm 316 and offset jack arm 318 are typically steel I-beams welded to the steel rectangular box beam 302. Although the screw jack 320 may be welded to the jack arm 316, it is perhaps better removably mounted with nuts and bolts or other similar mechanical fasteners. For transport, it appears easiest if the screw jacks 320 and jack stands 322 are removed, thereby minimizing the vertical protrusions above and below the steel rectangular box beam 302.

Also near the shoe end 314 of the steel rectangular box beam 302 are one or more threaded fasteners attached on top 326 and on one side 328, which function to secure a subsequent interior length adjustment. Additionally, two or more "pad-eye" attachment points 330, 332 may be attached to the steel rectangular box beam 302. These two "pad-eye" attachment points 330, 332 allow for ease in hoisting the spider arm 300. Additionally, these two "pad-eye" attachment points 330, 332 may be identical to those previously used as tower 200 "pad-eye" anchors 208 to minimize the number of different fabricated parts. Precision holes 334 are spaced along the length of the rectangular box beam 302 to allow for accurate insertion placement of a spider arm adjustment, described below.

Each precision hole 334 may comprise a precision drilled hole within a weldable tab (details not shown). The weldable tab is positioned, along with its precision hole, in a required location, and then welded in place. The result is an accurately located precision hole 334 that after welding may be positioned within ±0.005 inches of a desired location.

Figure 4:
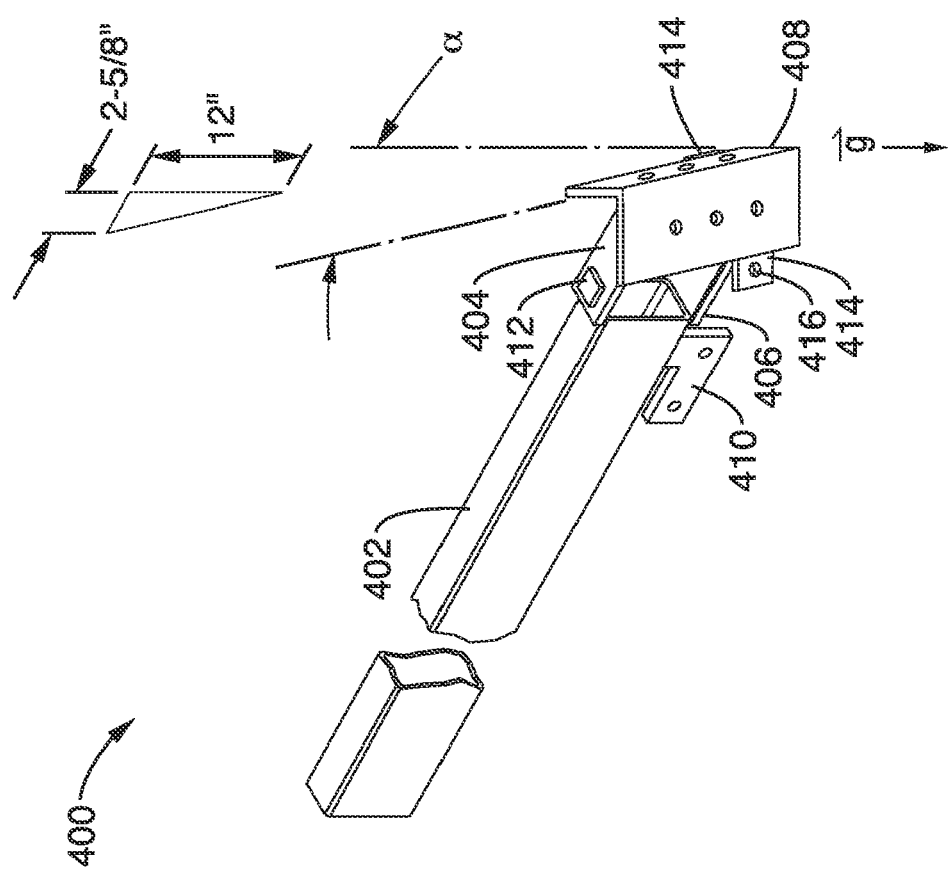
FIG. 4 is a perspective view of a spider arm adjustment.

FIG. 4 is a perspective view of a spider arm adjustment 400. Here, a smaller rectangular beam 402 is chosen so as to be able to slide within the steel rectangular box beam 302 of the spider arm 300 of FIG. 3. For instance, if the steel rectangular box beam 302 is dimensioned 8"×4"×¼" then the smaller rectangular beam 402 may be sized 7"×3"×¼" so as to loosely slidably fit inside the steel rectangular box beam 302.

Moving along the smaller rectangular beam 402, an upper shoe plate 404 and lower shoe plate 406 are attached, typically by welding. The upper shoe plate 404 and lower shoe plate 406 allow for accurate angular placement of a shoe 408 at whatever prescribed angular orientation may be required. For example, in the U.S. power line tower industry, a common angular orientation is an angle of 2⅝" in 12" off of vertical, which in the industry is referred to as the "batter" angle.

Attached to the bottom side of the smaller size rectangular beam 402 is a spider arm adjustment 400 attachment tab 410.

A dimensional reference pad 412 is disposed atop the upper shoe plate 404 of the spider arm adjustment 400. For lateral stabilization, a shoe attachment tab 414 is attached to the shoe 408 on either side, typically by welding. The shoe attachment tab 414 has a hole 416 through which a subsequent attachment is made for lateral stabilization.

Figure 5:
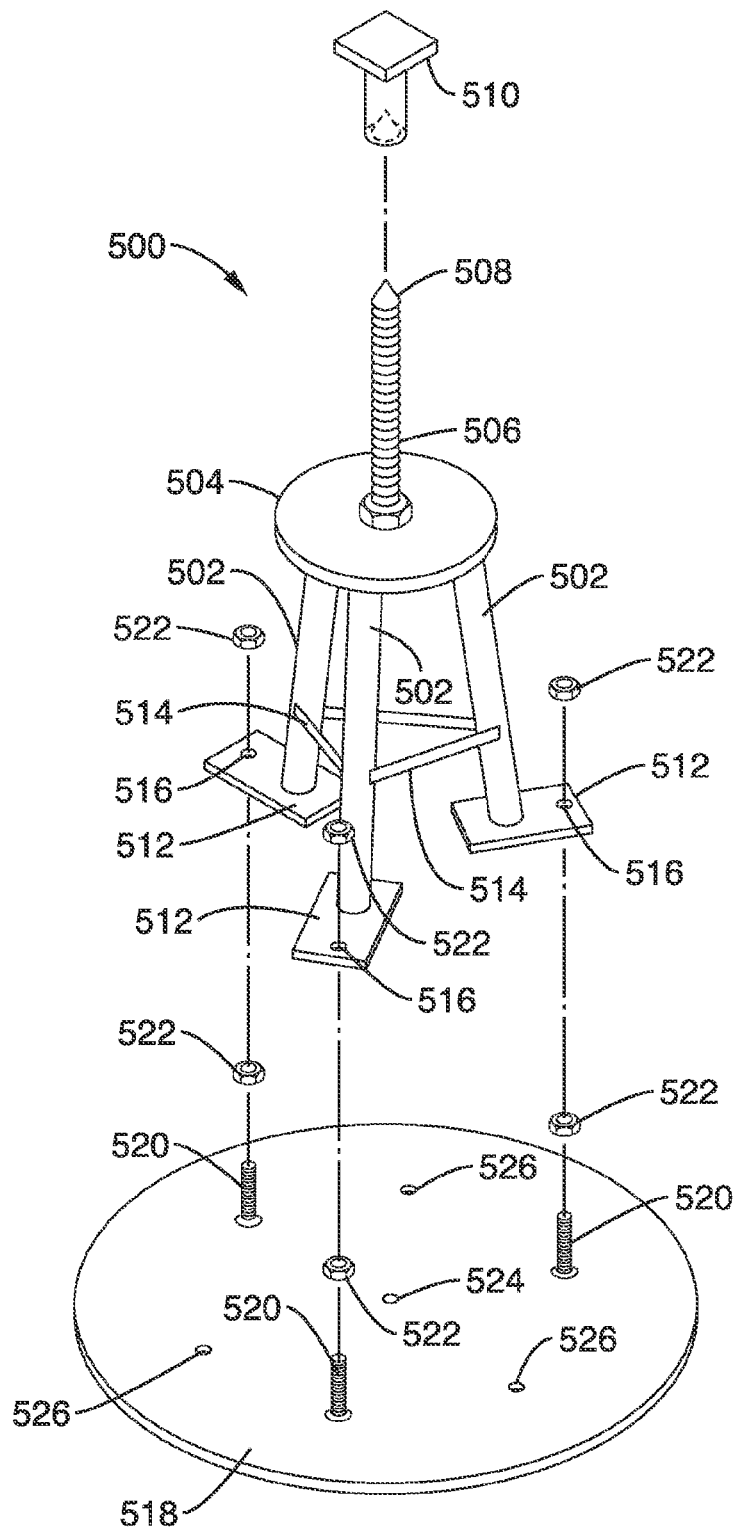
FIG. 5 is a perspective view of an alignment jig chair.

FIG. 5 is a perspective view of an alignment jig chair 500. The alignment jig chair 500 is made of tubular steel 502 members acting as legs, forming a tripod arrangement that joins at the chair seat 504. A threaded section 506 adjustably extends from the chair seat 504, to allow for vertical adjustment of a conical point 508 atop the threaded section 506.

When the alignment jig chair 500 is not otherwise in use, protector 510 is seated over the conical taper 508 to prevent injury from the otherwise exposed conical taper 508. The tubular steel 502 members terminate at the bottom on chair pads 512 to prevent sinking into the ground under considerable loads. Finally, to address the high level of loading (perhaps 8-12 tons or more), cross members 514 interconnect the tubular steel 502 members.

The alignment jig chair 500 chair pads 512 have mounting holes 516 that allow for angular orientation adjustment. Circular plate 518 sits beneath the alignment jig chair 500. In one embodiment, all-thread 520 is welded in three locations to the circular plate 518, with nuts 522 to allow for individual height adjustment of each chair pad 512. Alternatively, in other embodiments, the all-thread 520 may be removable from the circular plate 518, either passing through reference holes in the circular plate 518, or threaded into circular plate 518.

During assembly, the circular plate 518 is placed in its proper location. Next, the alignment jig chair 500 is lowered so that the chair pad 512 mounting holes 516 allow entry of the all-thread 520. Then the three nuts 522 are adjusted to properly position the conical taper 508 along a vertical axis, after which, an additional three nuts 522 may be used to secure the chair pads 512. The proper location is achieved by collocating a central hole 524 over a survey marker (not shown here). After the collocating process, retention holes 526 in the circular plate 518 have stakes driven through them (not shown) to maintain a proper location.

Figure 6:
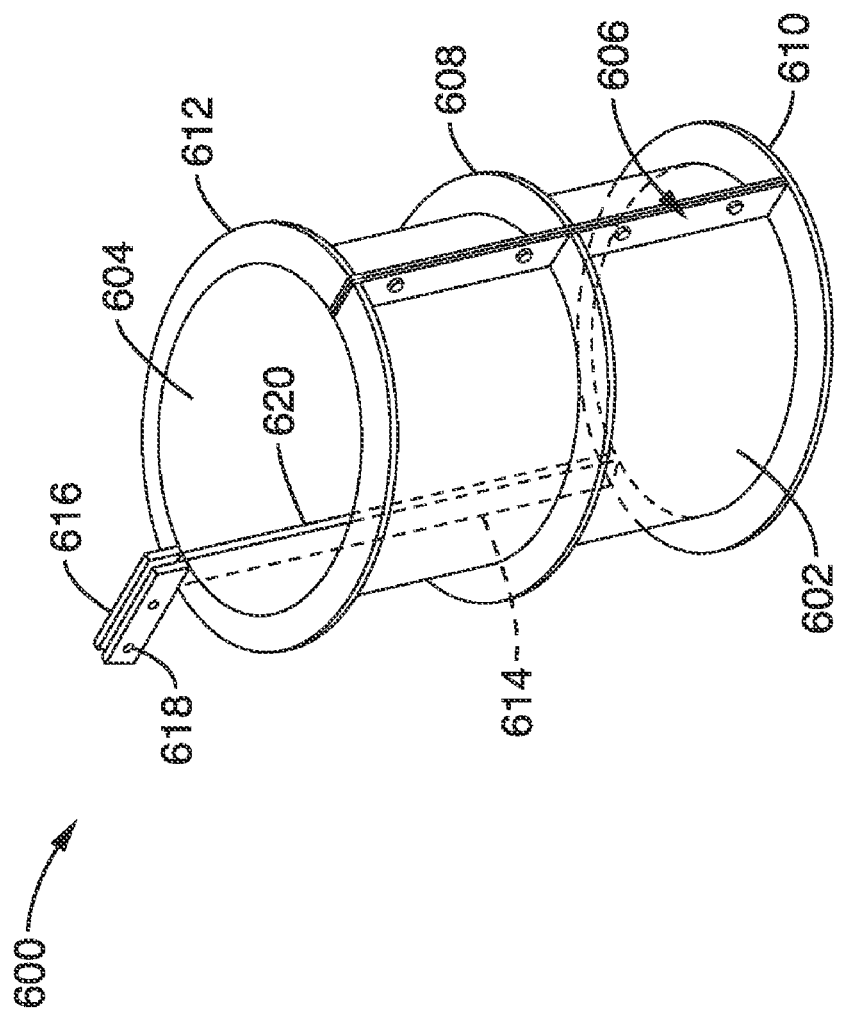
FIG. 6 is a perspective view of a concrete form can.

FIG. 6 is a perspective view of a concrete form can 600. Here, a front side 602 and back side 604 are attached by removably joining together side flanges 606 from both the front side 602 and the back side 604. A circular middle rib 608, lower rib 610, and top rib 612 serve to minimize dimensional distortion when the concrete form can 600 is full of liquid cement. Protruding from the top rib 612 along the left side vertical flange 614 is a can attachment tab 616 with two or more can attachment holes 618. Stripping bar 620 is disposed between the front side 602 and the back side 604 below the can attachment tab 616 to facilitate subsequent use.

Figure 7:
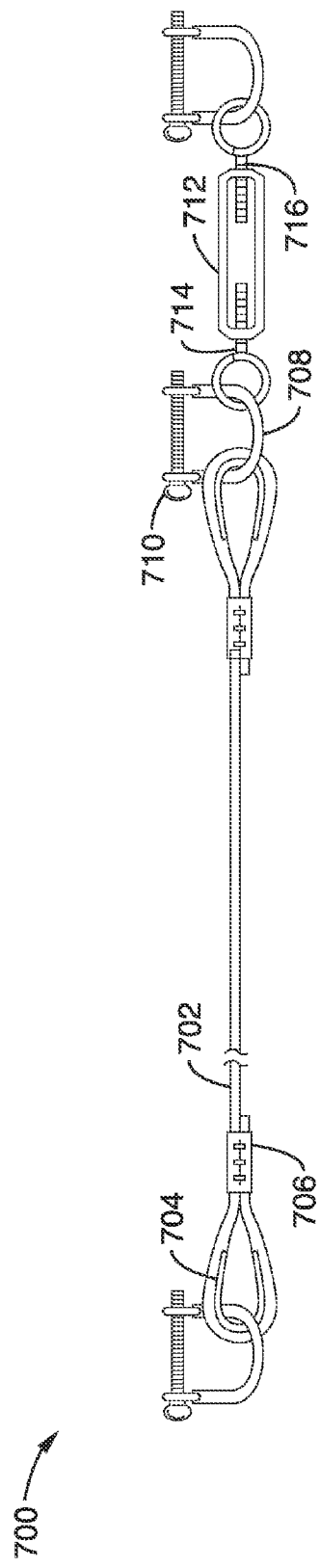
FIG. 7 is a perspective view of an adjustable length cable.

FIG. 7 details a rope segment 700. Here, a rope 702 (typically a braided steel rope) may be formed about a rigging eye 704 and swaged into place with a swage 706 on both ends of a rope segment (alternatively, a U-bolt/saddle arrangement may be use to replace the swage). A threaded shackle 708 may be secured with a threaded pin 710 to connect the metal rope 702 to a turnbuckle 712 having a right hand threaded end 714 and a left hand threaded end 716 to allow for overall fine length adjustment of the overall rope segment 700. By using additional components, or different initial length metal ropes 702, the overall rope segment 700 may be made to span a large length with a high load carrying capability and minimal stretch. By allowing for adjustability in the overall length of rope segment 700, variations in thermal expansion may be accommodated.

Figure 8:
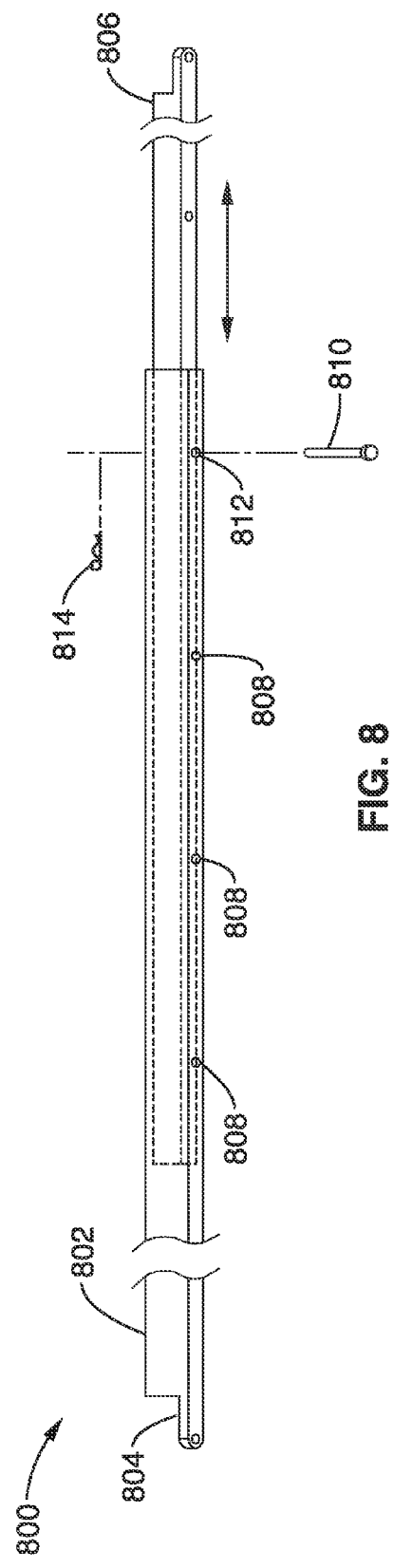
FIG. 8 is a perspective view of an adjustable length chord.

FIG. 8 is a perspective view of a "chord" 800. Here, a chord segment 802 may be a rectangular or square beam, to which is attached a fixed end 804 and a movable end 806. Overall length of the chord 800 is accomplished by moving the movable end 806 into or out of the chord segment 802 to align with one of the length set holes 808. These length set holes 808 may resemble the precision holes previously described. Once adjusted to the appropriate length, clevis pin 810 is passed through a selected hole 812 and secured by clevis clip 814. At this point, the chord 800 has been adjusted to a particular predefined overall length.

As shown in this embodiment of FIG. 8, the fixed end 804 and movable end 806 have attachment points that are offset from the center line of the chord 800. However, in other embodiments, the chord 800 attachment points may also be centered on the center line of the chord 800. It is this latter arrangement that is shown in subsequent assembly drawings.

Initial Assembly of Components

Figure 9:
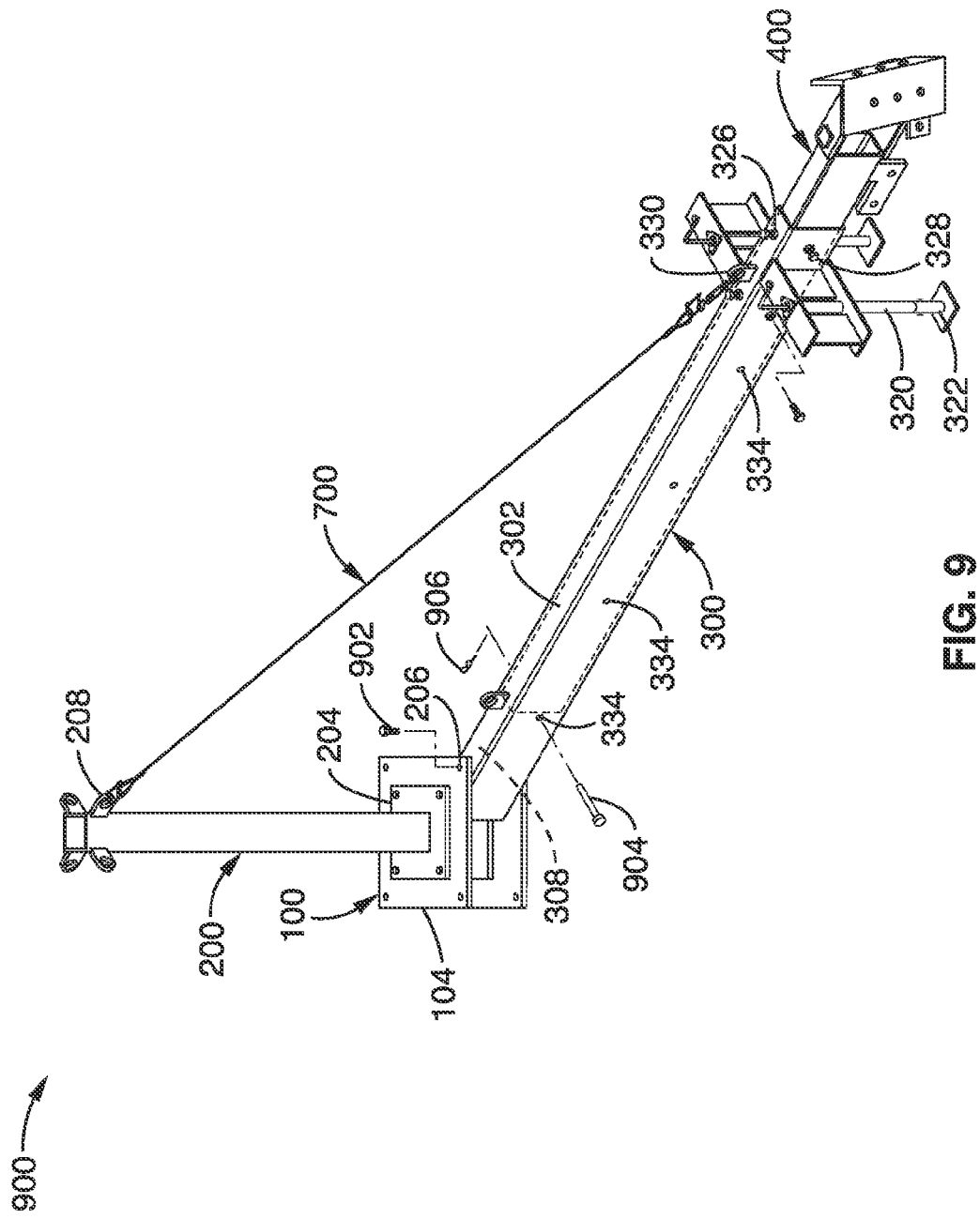
FIG. 9 is a perspective view of a first step in the initial assembly of the alignment jig.

FIG. 9 shows an initial assembly step 900 for the overall alignment jig, when all parts have been fabricated, but have never been previously assembled. Here, the tower 200 has been attached to the alignment jig hub 100, as has one spider arm 300. This attachment occurs via a bolt 902 passing through the tower base 204, then through the upper hub plate 104, then through the top 308 of the rectangular box beam 302 into a nut (not shown). The spider arm adjustment 400 has been slid into the spider arm 300 to an appropriately chosen length to be retained by a clevis pin 904 that has been passed through the precision hole 334 in the rectangular box beam 302, to be retained by the clevis clip 906. At this point, one or more threaded fasteners attached to the top 326 and to one side 328 of the rectangular box beam 302 are secured, locking the spider arm adjustment 400 removably in place for use.

By using a plurality of precision holes 334, a single spider arm adjustment 400 may be used in a variety of configurations, adding greatly to the usability and flexibility of the invention.

Next, a rope segment 700 is attached between tower 200 "pad-eye" anchor 208 and corresponding spider arm 300 "pad-eye" attachment point 330. The rope segment 700 is then adjusted to an overall length such that the tower 200 is able to hold the spider arm 300 level when lifted through tension in the rope segment 700.

Figure 10:
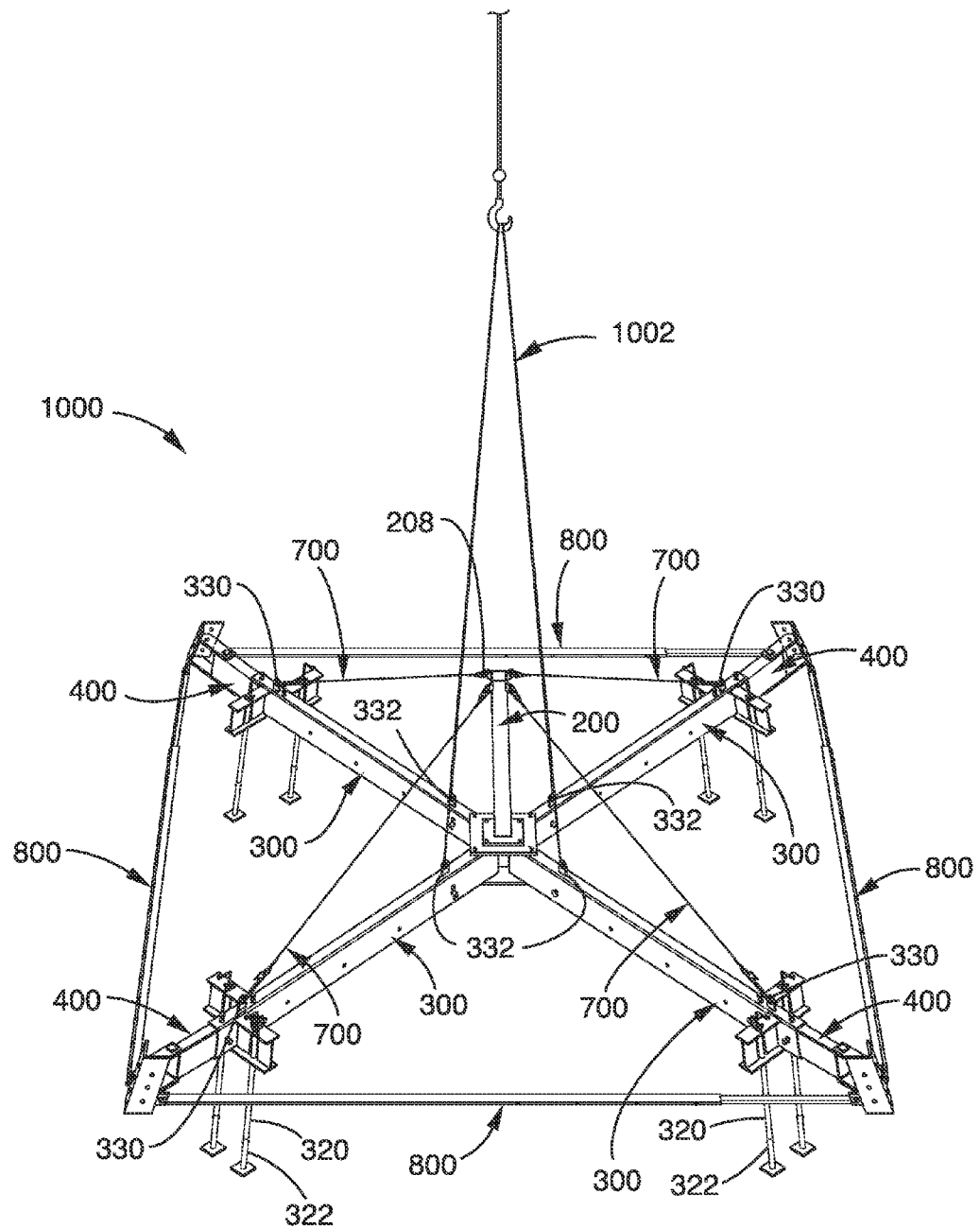
FIG. 10 is a perspective view of an installed assembled alignment jig prior to alignment jig installation, load bearing member installation and footing pouring.

FIG. 10 is a perspective view of an alignment jig 1000 hoisted with the screw jacks 320 and jack stands 322 installed. Similarly, all other spider arms 300 are attached and guyed into place with respective rope segments 700. Generally, there are four spider arms 300 symmetrically disposed about the tower 200. Additional lifting tackle 1002 may be attached to the spider arm 300 "pad-eye" anchor 332, thereby allowing for the hoisting of the entire alignment jig 1000 to be moved as required for use.

Not shown here are four concrete form cans 600 that may also be attached to the alignment jig 1000 prior to, or after, hoisting.

Figure 11:
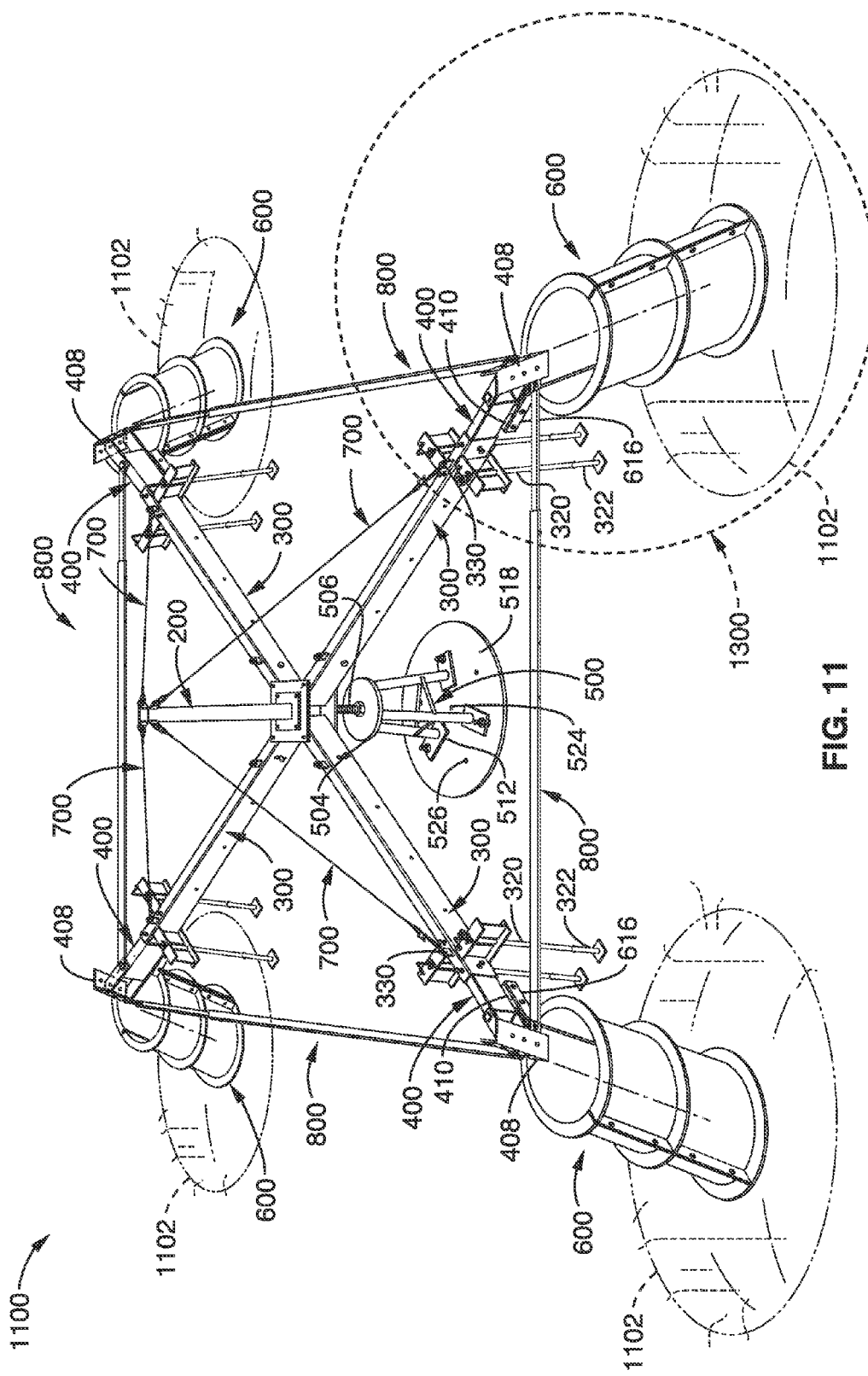
FIG. 11 is a perspective view of a completely assembled alignment jig prior to footing pouring.

FIG. 11 is a perspective view of an installed assembled alignment jig completely set up prior to footing pouring 1100. Here, a circular steel plate 518 is positioned so that a central hole 524 allows vertical visual access to a survey marker (not shown here). The central hole 524 allows for true vertical positioning of the alignment jig chair 500 threaded section 506 above the survey marker. For clarity, the hoisting apparatus of FIG. 10 has been removed, though it may remain in place as required.

Concrete form cans 600 have been attached by bolting spider arm adjustment 400 attachment tab 410 to concrete form can 600 can attachment tab 616. By collocating and attaching the attachment tab 410 with the concrete form can 600 attachment tab 616, the shoe 408 is correctly positioned so as to pass a structural member (not shown at this time) aligned by the shoe 408 through the concrete form can 600 above footing holes 1102.

Shipment of the Alignment Jig

Transport of the installed assembled alignment jig completely set up prior to footing pouring 1100 is cumbersome. To simplify shipment of the alignment jig, first the tower 200 is removed due to its height. Additionally, the concrete form cans 600 are removed. Additionally, the screw jacks 320 and jack stands 322 are removed.

Figure 12:
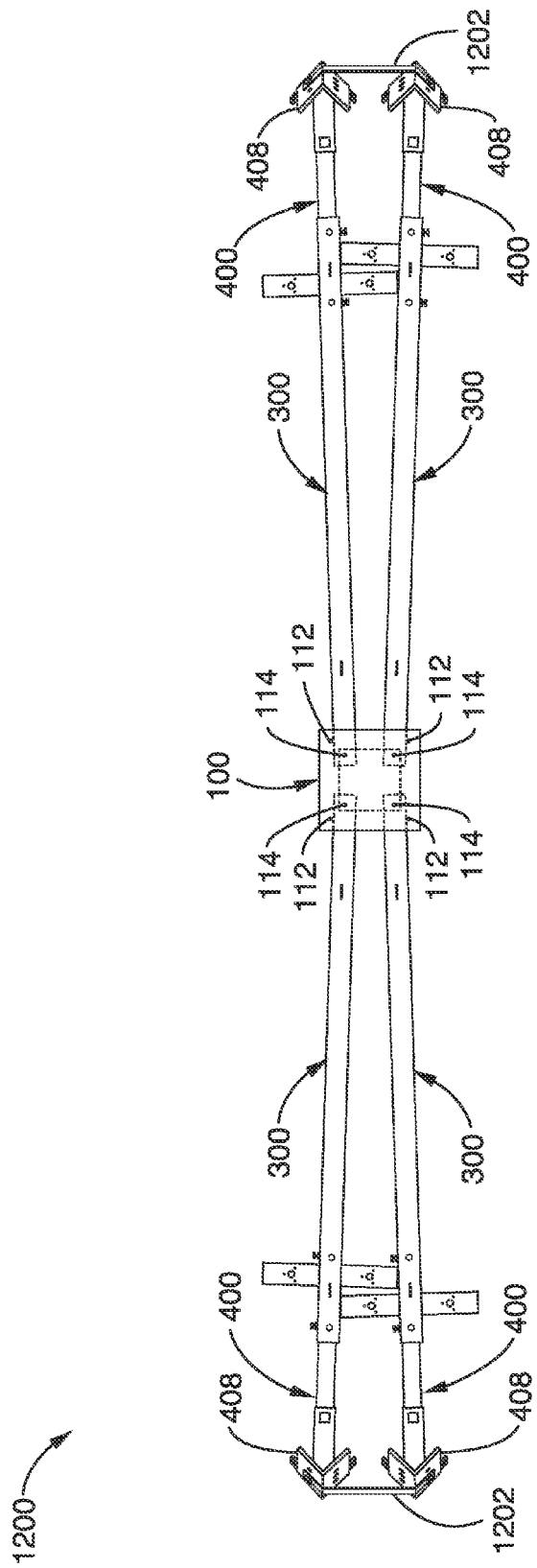
FIG. 12 is a top view of an alignment jig partially disassembled and reconfigured for shipping.

FIG. 12 is a top view of an alignment jig prepared for shipping 1200. Here, the spider arms 300 have been folded about the alignment jig hub 100 by removal of bolts previously passing through holes 112. Additionally the holes 114 remain from removal of the tower 200 (not shown in this view). At this point, only loosened bolts hold the spider arms 300 to the alignment jig hub 100. The shoes 408 of each spider arm adjustment 400 are attached together two to a side by a shipping strap 1202 that bolts to the shoes 408 as indicated. Additionally, the spider arm adjustments 400 may be slid as far as possible into the spider arms 300 to minimize overall length.

In this shipping configuration, the alignment jig prepared for shipping 1200 is little higher than the vertical extent of the shoes 408. In this configuration, storage and shipment becomes much simpler than otherwise.

Exploded View of the Shoe End of the Alignment Jig

Figure 13:
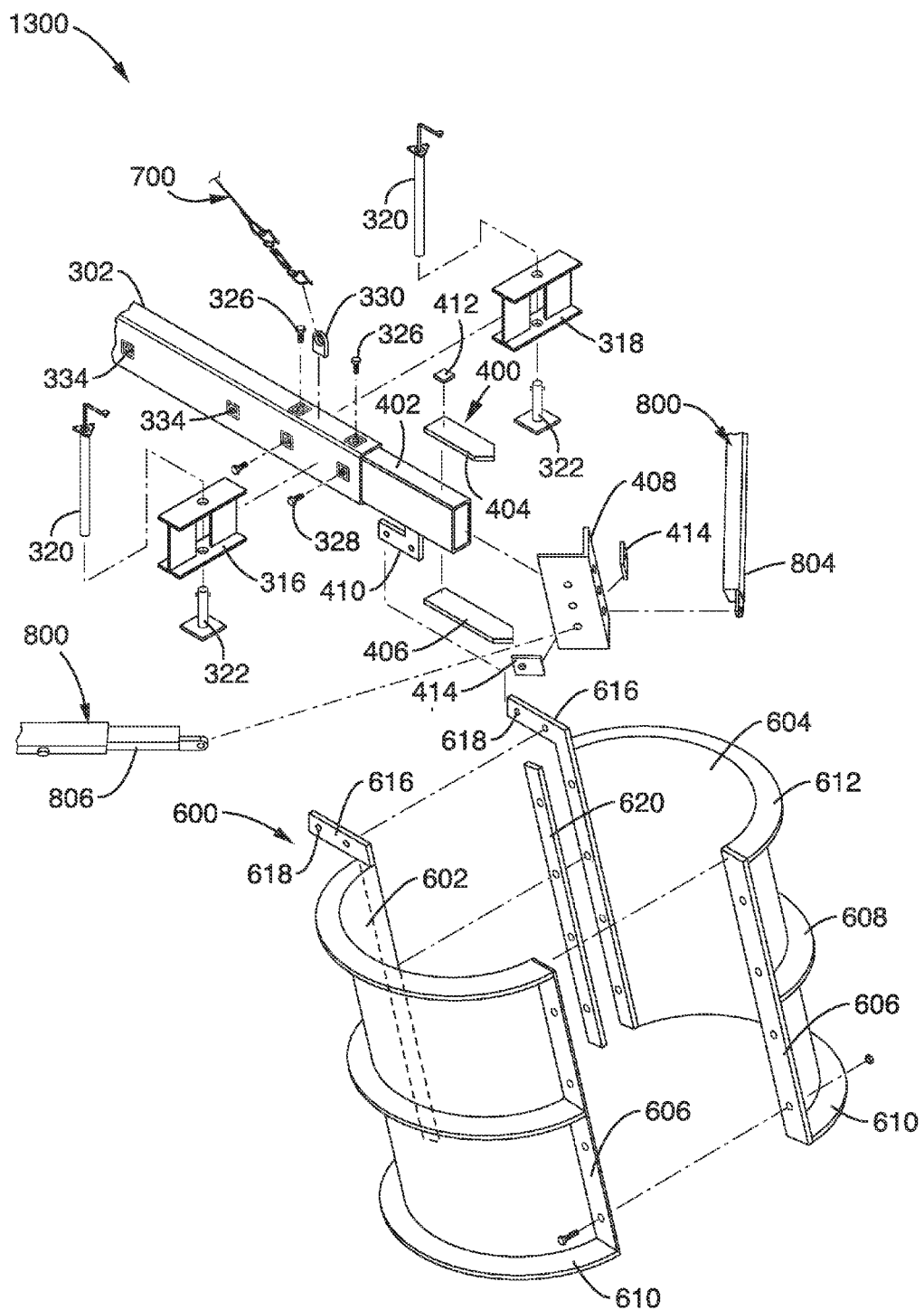
FIG. 13 is an exploded view of one corner of the completely assembled alignment jig of FIG. 11.

FIG. 13 is an exploded perspective view of a shoe end 1300 of the alignment jig. As each of these elements has been previously described, no further description is needed. However, in the previous figures, the attachment of the concrete form can 600 to the spider arm adjustment 400 attachment tab 410 was difficult to observe.

Here, concrete form can 600 can attachment tab 616 is collocated and attached to attachment tab 410. Typically the concrete form can 600 is assembled as a unit first, and then attached to the attachment tab 410. The stripping bar 620 is readily apparent in this FIG. 13.

Using the Alignment Jig

Next, we will show how to use the alignment jig to install a tower in a sequence of steps.

Figure 14A:
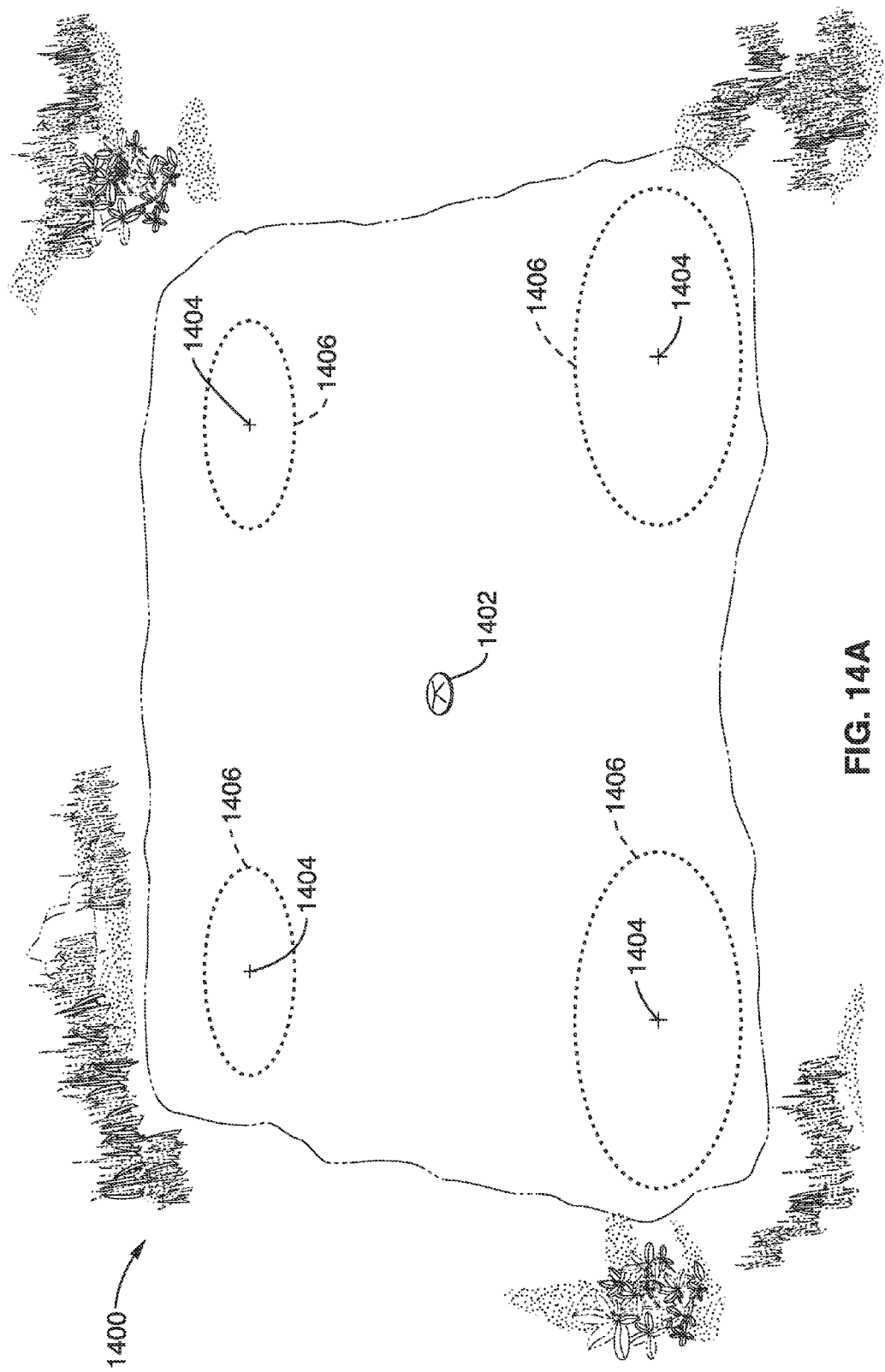
FIG. 14A is a perspective view of a typical tower site with a central survey marker and initial locations indicated for tower footing locations.

FIG. 14A is an initial perspective view of the intended location for a tower 1400. Here, a survey marker 1402 shows the center location of the tower. Typically, the survey marker 1402 has been surveyed and placed at a proper surveyed reference location, indicating the center of the tower to be installed. Four tower footings are to be placed at centers 1404 so that footing holes may be bored at indicated locations 1406.

Figure 14B:
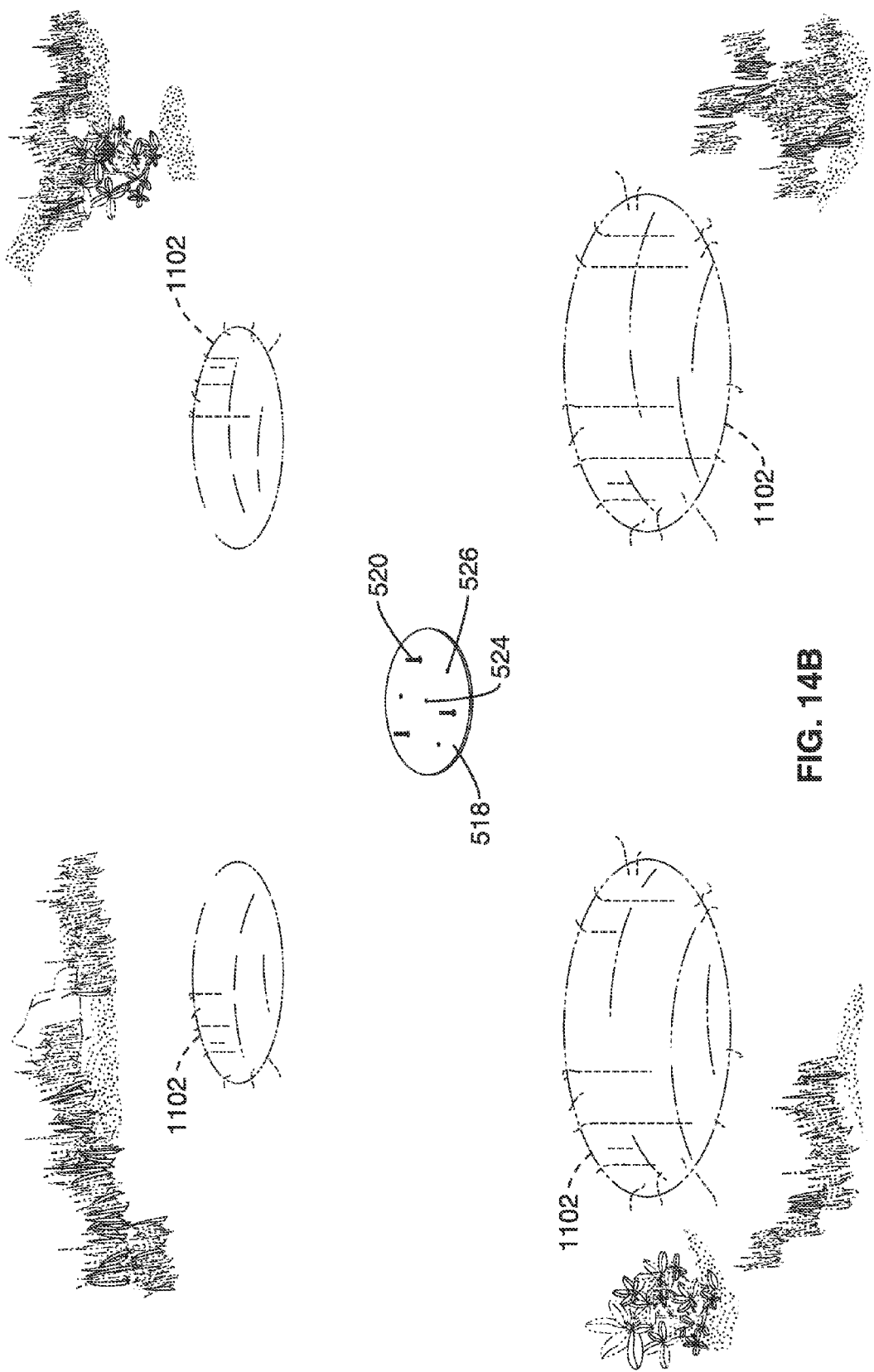
FIG. 14B is a perspective view that follows the sequence of FIG. 14A with a circular steel plate positioned so that a central hole allows vertical visual access to a survey marker, with footing holes already dug.

Refer now to FIG. 14B, which follows the sequence of FIG. 14A with a circular steel plate 518 positioned so that a central hole 524 allows vertical visual access to a survey marker (now covered by the circular steel plate 518). Holes 1102 have been drilled, typically with a caisson drill or auger. As the force loading expected on these footings can be very high, it is not uncommon to have footings drilled 8 feet (2.4384 meters) in diameter.

Figure 14C:
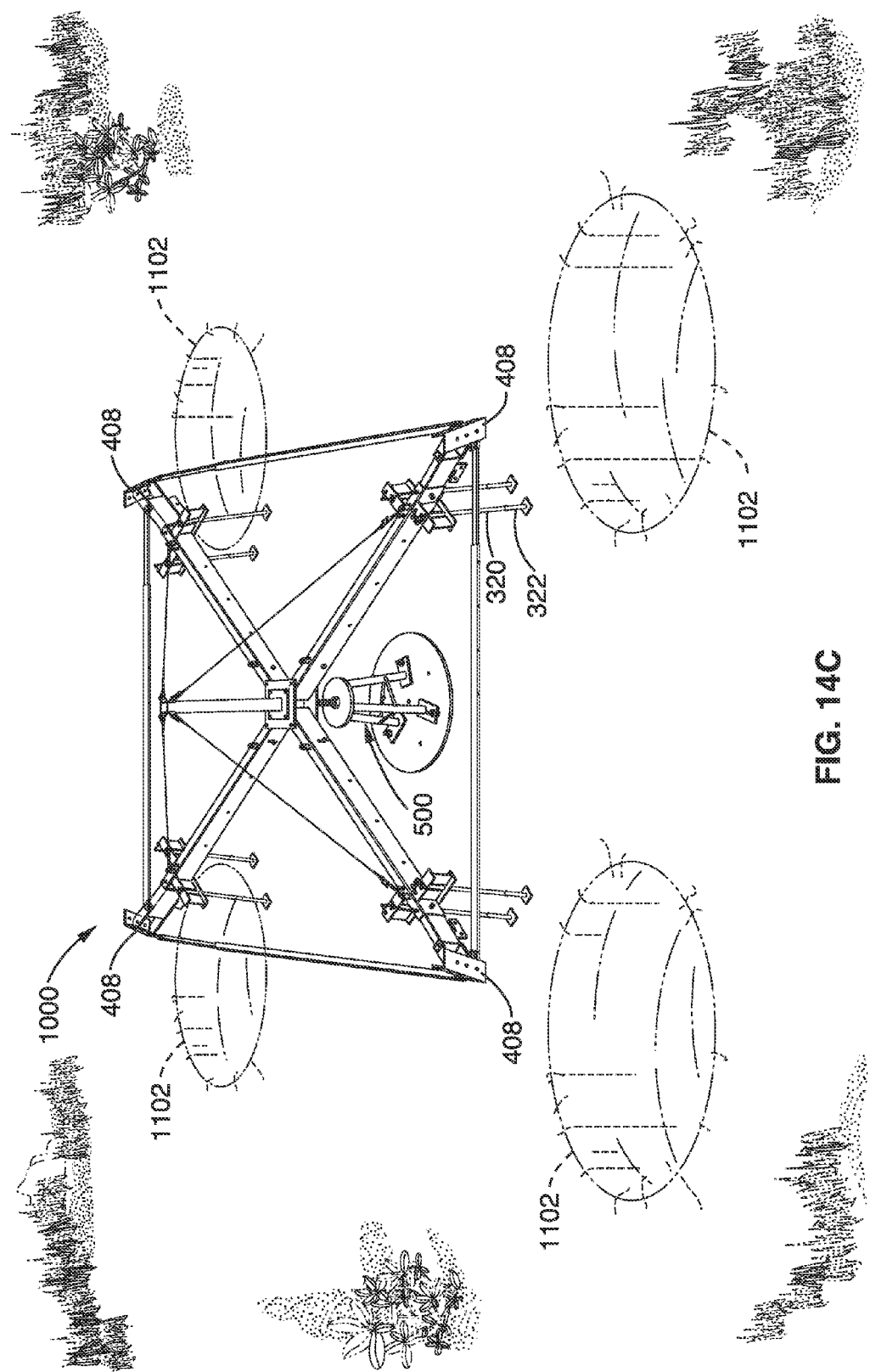
FIG. 14C is a perspective view of an alignment jig chair that has been positioned above the survey marker of FIG. 14B, where the alignment jig has been hoisted into place with the screw jacks and jack stands installed.

Refer now to FIG. 14C, which follows the site preparation shown in FIG. 14B. Here, the alignment jig chair 500 has been positioned above the survey marker, where the alignment jig 1000 hoisted into place with the screw jacks 320 and jack stands 322 installed (as previously shown in FIG. 10). Any lifting tackle 1002 has been visually removed to reduce clutter. Note that shoes 408 as yet have nothing attached to them.

Figure 14D:
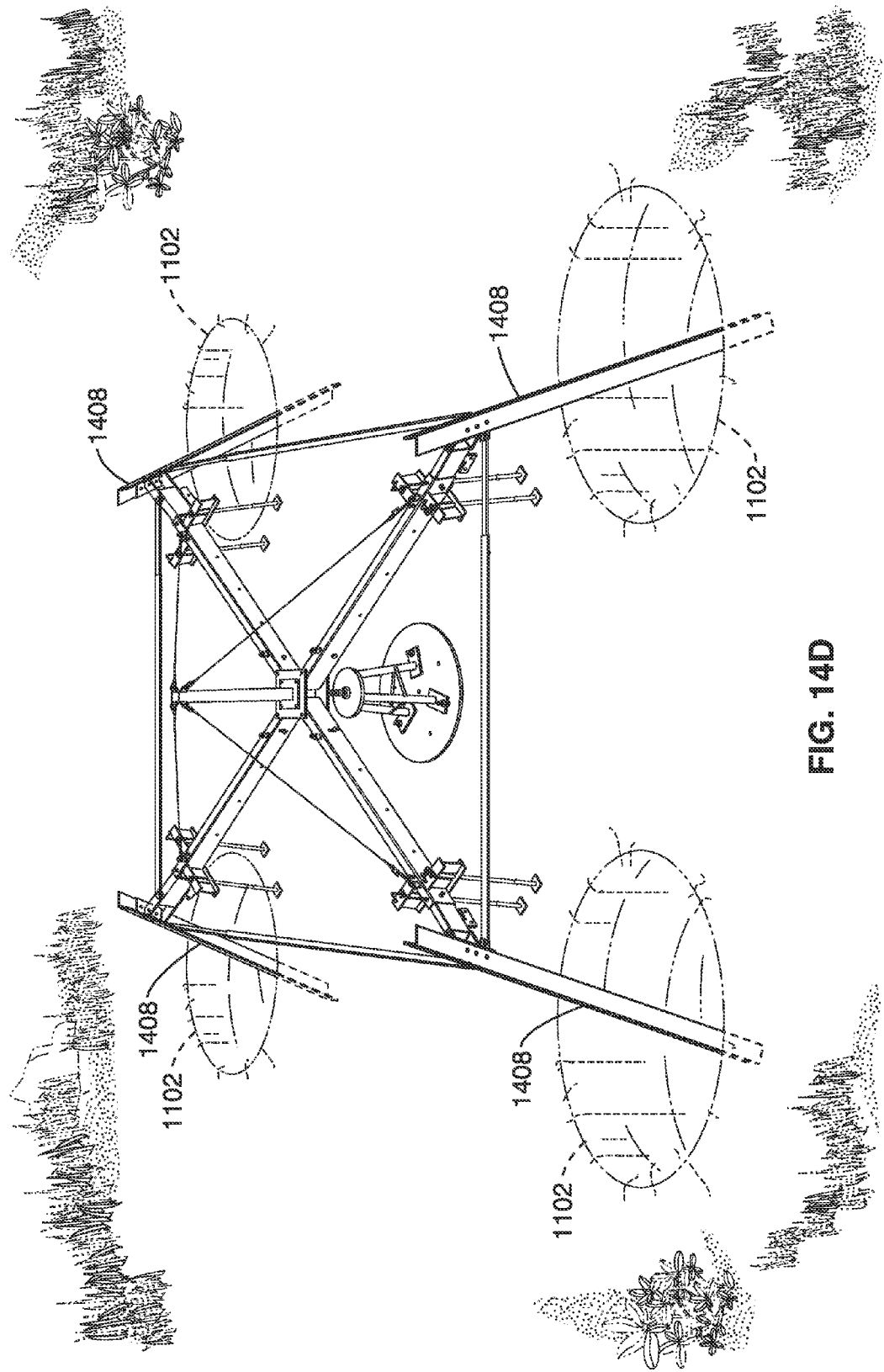
FIG. 14D is a perspective view where load bearing members have been attached to the shoes of FIG. 14C.

Refer now to FIG. 14D, where load bearing members 1408 have been attached to the shoes 408 of the preceding FIG. 14C. Additional reinforcing bar steel is likely added (but not shown here) to the holes 1102 consistent with the design requirements of the tower.

Figure 14E:
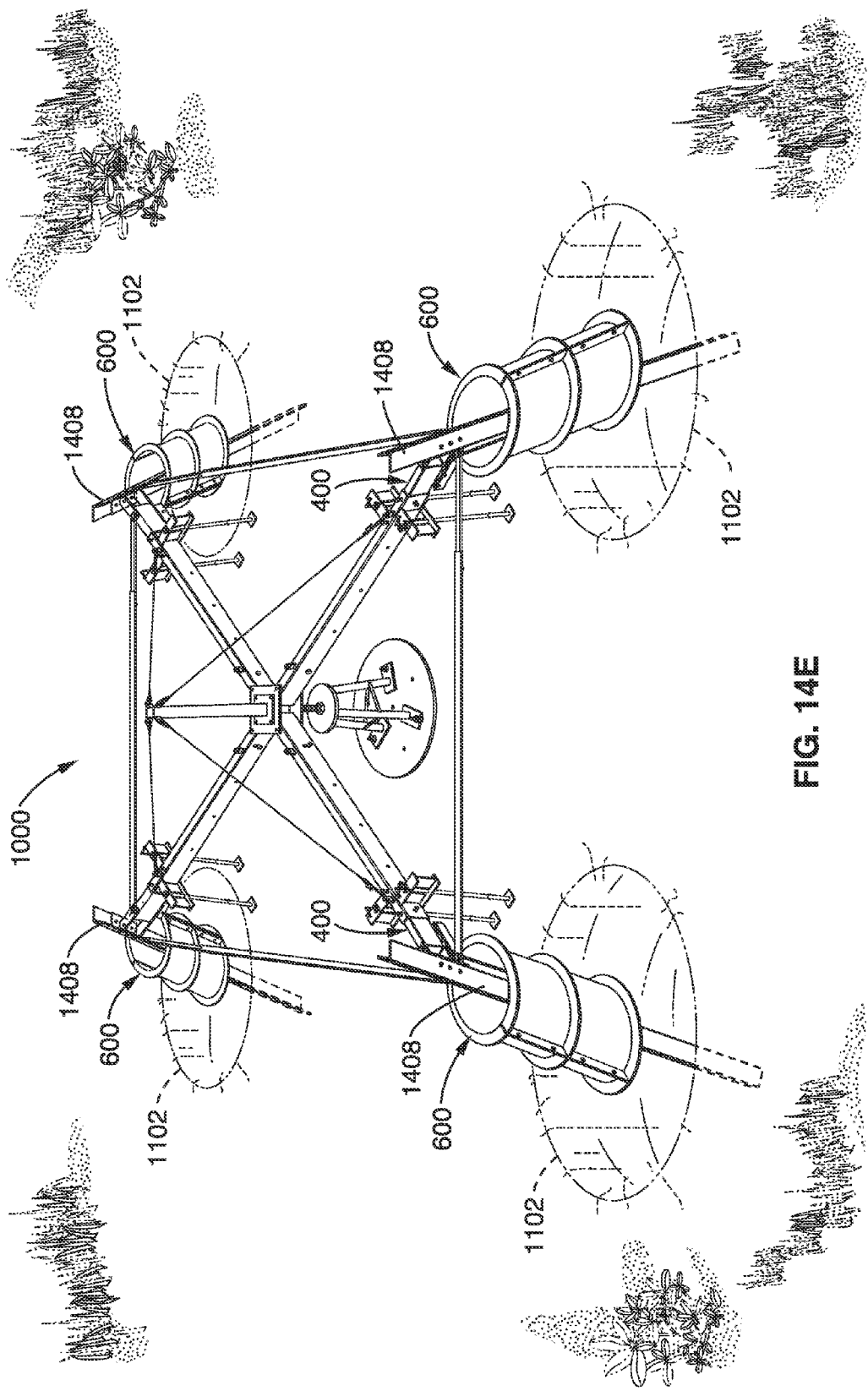
FIG. 14E is a perspective view where the concrete form cans have been assembled about the load bearing members of FIG. 14D to attach to the spider arm adjustments.

Refer now to FIG. 14E, where the concrete form cans 600 have been assembled about the load bearing members 1408 to attach to the spider arm adjustments 400. In the sequence presented here, the concrete form cans 600 were assembled about the load bearing members 1408 for clarity. In practice, it is common to assemble the concrete form cans 600 to the alignment jig 1000, and then install the load bearing members 1408. In either case, the load bearing members 1408 are bolted to the shoes 408 (previously seen in FIG. 14C), which are now hidden from view beneath the load bearing members 1408.

Figure 14F:
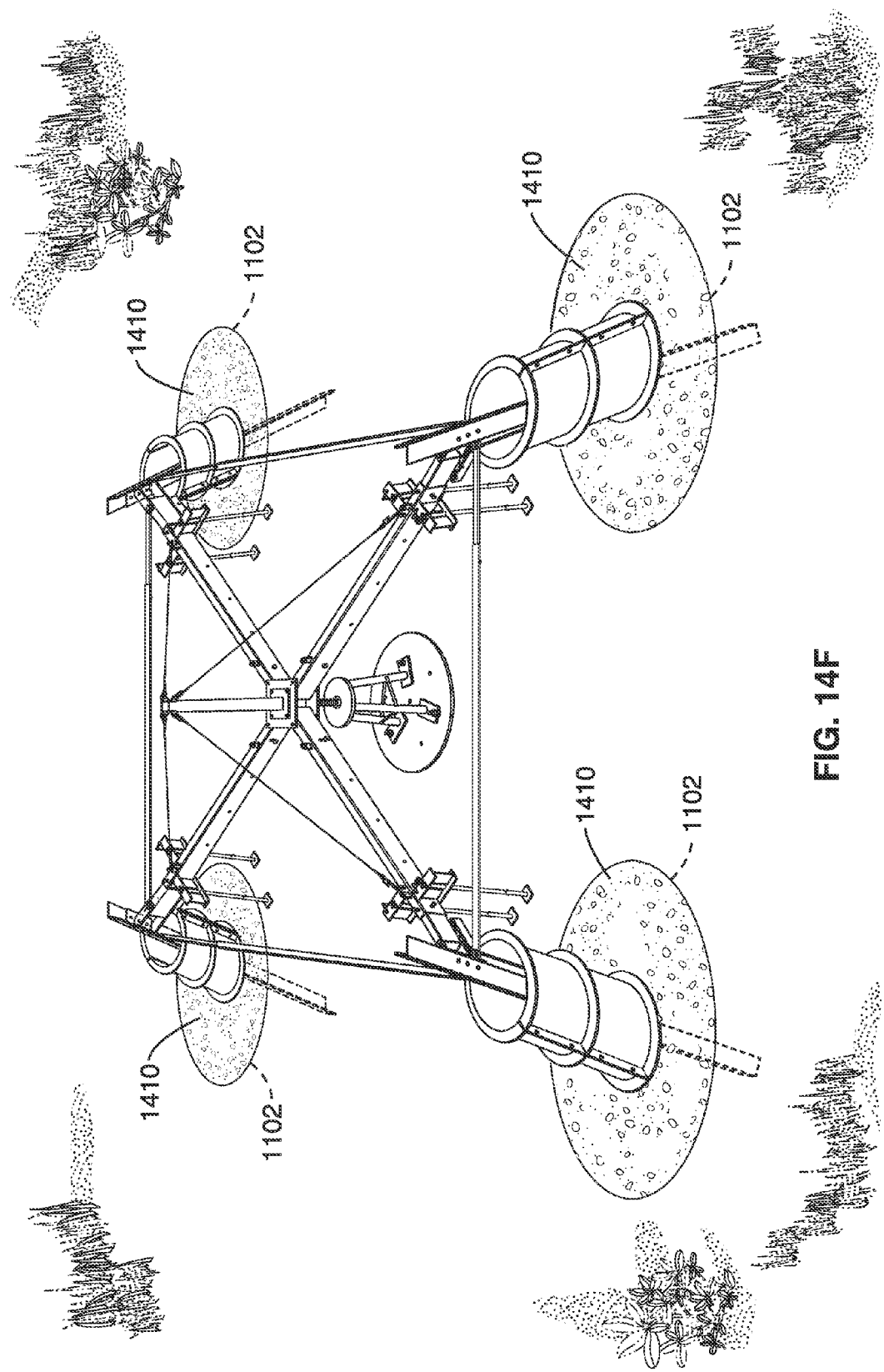
FIG. 14F is a perspective view where the holes of FIG. 14E have been filled with concrete.

Refer now to FIG. 14F, where the holes 1102 have been filled with concrete 1410. Typically, it takes as much as two hours to fill the holes 1102 with concrete 1410, vibrate out voids, and move from hole 1102 to another hole 1102.

Figure 14G:
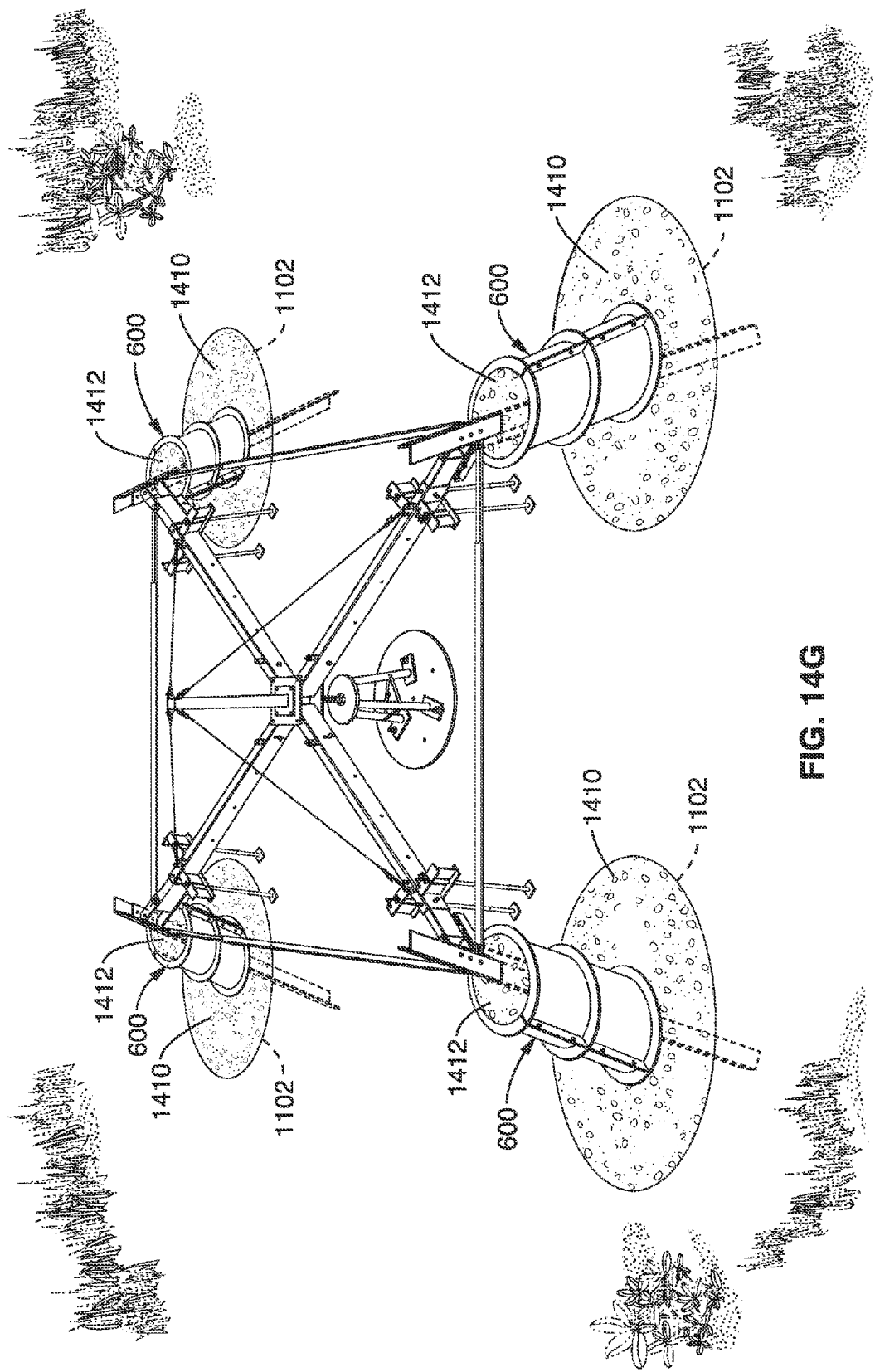
FIG. 14G is a perspective view where the concrete form cans of FIG. 14F have been filled with concrete.

Refer now to FIG. 14G, where the concrete form cans 600 have now been filled with concrete 1412. Generally, after performing the step of FIG. 14F, the hole 1102 concrete 1410 has cured (or "set") sufficiently that the concrete form cans 600 may be filled with concrete 1412. Otherwise, a little more time may be required prior to filling the concrete form cans 600.

By filling the concrete form cans 600 immediately after pouring the hole 1102 concrete 1410, a continuous pour is achieved so that the concrete 1410 and concrete 1412 appear contiguous, without a joint therebetween. Additionally, by pouring in this manner, there is only a single trip required for a concrete supplier, thereby reducing costs and time. At this point the concrete 1410 and 1412 is allowed to set for a period of time prior to removal of the concrete form cans 600.

Figure 14H:
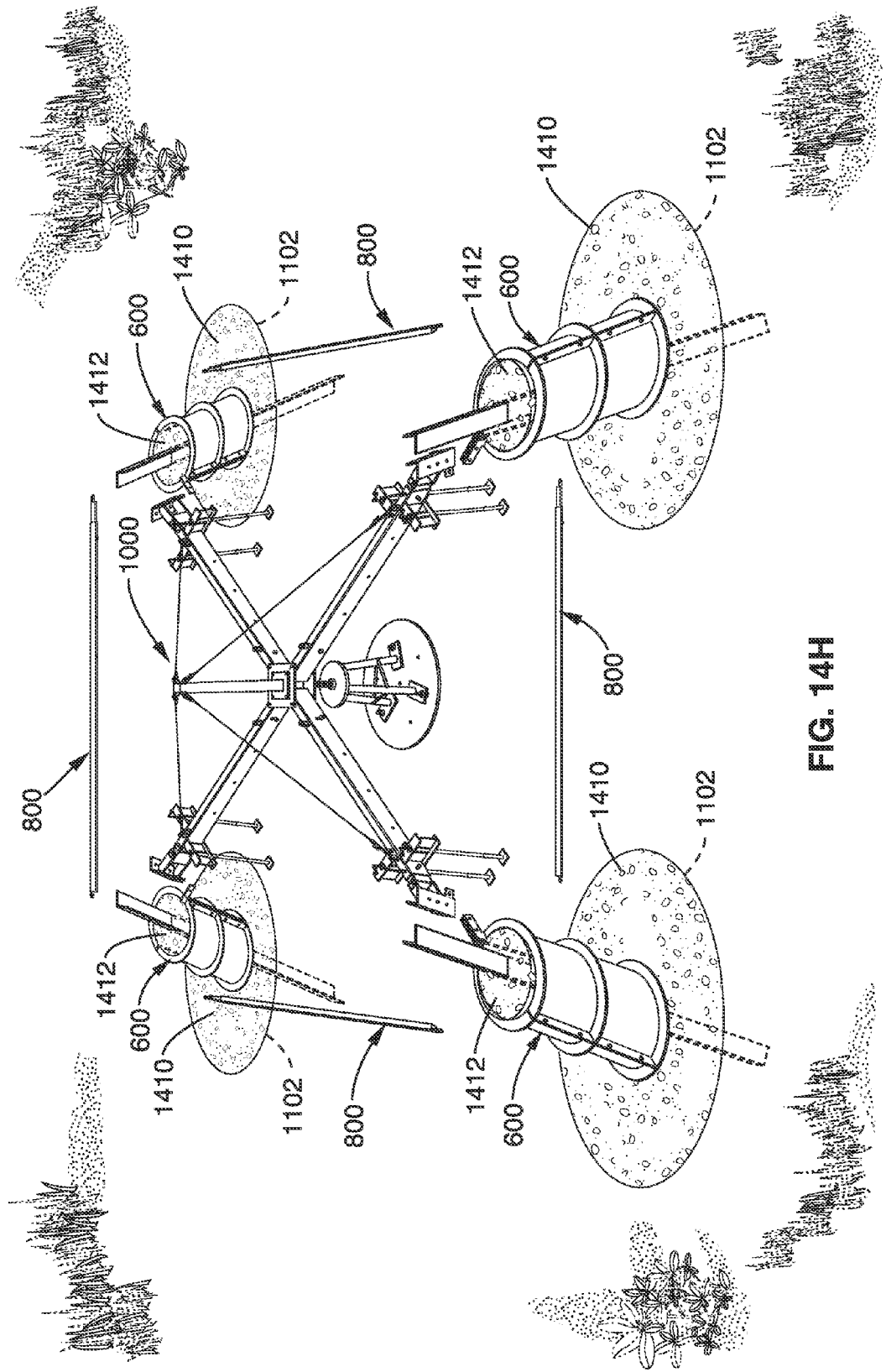
FIG. 14H is a perspective view where the concrete form cans of FIG. 14G have been detached from the alignment jig, and the alignment jig retracted, leaving the concrete poured in the concrete form cans projecting about the load bearing members.

Refer now to FIG. 14H, where the concrete form cans 600 of FIG. 14G have been disconnected from the alignment jig 1000, the chords 800 detached, and the alignment jig 1000 retracted. Alternatively, but not shown here, the chords 800 may be shortened in the retracted position, while remaining attached to the alignment jig 1000. In this configuration, the alignment jig 1000 may be readily hoisted from its present location to a new location.

Refer now to FIG. 14I, where the alignment jig 1000 of FIG. 14H has been removed, leaving concrete 1412 surrounding load bearing members 1408, continuing into concrete 1410 in holes 1102 to form a tower footing 1414.

Figure 14J:
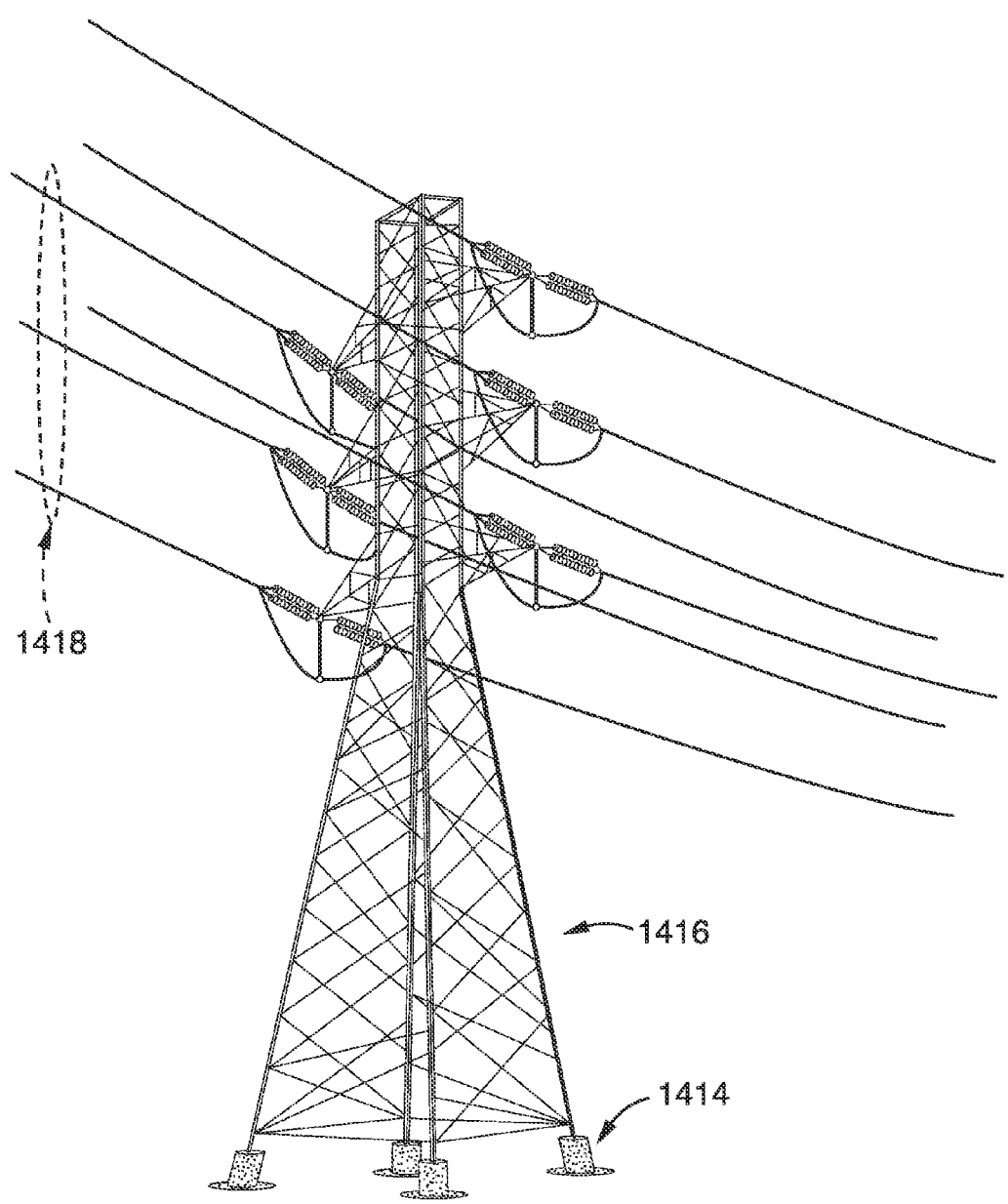
FIG. 14J is a perspective view where the footing of FIG. 14I has had a tower attached, with power lines attached to the tower.

Finally, refer to FIG. 14J, where the footing 1414 of FIG. 14I has had a tower 1416 attached, and power lines 1418 attached to the tower 1416.

Although the figures here have indicated a relatively flat site for locating a tower footing, by means of elevated forms surrounding holes 1102, and corresponding scaffolding, even highly sloping terrain may be used to accommodate tower footings. This allows for a much wider design latitude for tower locations in hilly or mountainous terrain.

From the discussion above it will be appreciated that the invention can be embodied in various ways, including the following:

1. An alignment jig, comprising: a hub; and means for placing one or more load bearing members in prescribed orientations.

2. The alignment jig of embodiment 1, wherein the means for placing one or more load bearing members in prescribed orientations comprises: one or more spider arms, each spider arm comprising a hub end and a shoe end; wherein the spider arms are connected to the hub at their respective hub ends.

3. The alignment jig of embodiment 2, wherein the means for placing one or more load bearing members in prescribed orientations comprises: a spider arm adjustment that attaches to one of the spider arms at the shoe end; and a shoe attached to the spider arm adjustment.

4. The alignment jig of embodiment 3, wherein the spider arm adjustment allows a plurality of overall length adjustments of a shoe to hub distance, thereby allowing for a corresponding plurality of jig placement patterns.

5. The alignment jig of embodiment 4, wherein the means for placing one or more load bearing members in prescribed orientations comprises: one or more chords with a connection point at each of two chord ends; wherein the chords are connected to the shoe by attachment of one connection point to one shoe at both chord ends.

6. The alignment jig of embodiment 5, wherein there are four spider arms corresponding with four spider arm adjustments.

7. The alignment jig of embodiment 6, wherein there are four chords.

8. The alignment jig of embodiment 5, wherein the chords are retractable on at least one end.

9. The alignment jig of embodiment 4, wherein the spider arm adjustments are retractable.

10. The alignment jig of embodiment 8, wherein the spider arm adjustments and chords are adjustable to one or more preset lengths.

11. The alignment jig of embodiment 1, wherein the means for placing one or more load bearing members in prescribed orientations comprises a tower removably attached to the hub.

12. The alignment jig of embodiment 11, wherein the means for placing one or more load bearing members in prescribed orientations comprises one rope segment forming a tensile connection between the tower and each spider arm.

13. An alignment jig, comprising: (a) a hub; (b) four spider arms, each spider arm comprising a hub end and a shoe end, wherein each hub end is removably attached to the hub; (c) a spider arm adjustment slidably connected on each spider arm at one or more preset lengths; (d) a shoe attached to an end of the spider arm adjustment, wherein the shoe allows for placement of a tower leg; (e) four chords, each chord comprising a connection point at each of two chord ends, wherein the chords are connected to the spider arms by attachment of one connection point to one shoe at each of both chord ends, and whereby each shoe end is thereby connected to two different chords.

14. The alignment jig of embodiment 13, further comprising: a tower attached to a top side of the hub; and at least one rope segment connecting each spider arm to the tower in tension; a spider arm adjustment attachment tab disposed on each spider arm adjustment; and a footing form attachment tab, removably connected to one spider arm adjustment attachment tab.

15. The alignment jig of embodiment 14, further comprising: (a) a chair comprising three legs joining at a chair seat, a threaded section threadedly disposed on the chair seat, and a conical taper disposed atop the threaded section distal from the chair seat; and (b) a central conical alignment receptacle disposed on the hub, whereby the conical taper mates with the central conical alignment receptacle.

16. A method of aligning tower legs, comprising: (a) providing a survey marker at a surveyed reference location; (b) leveling a circular region about the survey marker; (c) placing a circular plate about the surveyed marker, the circular plate comprising an opening whereby the surveyed marker may be viewed; (d) placing a chair atop the circular plate, the chair comprising three legs joining at a chair seat, a threaded section threadedly disposed on the chair seat, and a conical taper disposed atop the threaded section above the chair seat; and (e) providing an alignment jig comprising a central conical alignment receptacle disposed on a hub, whereby the central conical taper mates with the central taper, whereby the alignment jig may be vertically spaced above the surveyed reference location at a specified elevation, and whereby the alignment jig is centered vertically above the survey marker.

17. The method of aligning tower legs of embodiment 16, wherein the alignment jig comprises: two or more spider arms attached to the hub; a spider arm adjustment attached to each spider arm, terminating in a shoe attached to the spider arm adjustment; one or more chords with a connection point at each of two chord ends; wherein the chords are connected to two shoes by attachment of one connection point to one shoe at both chord ends.

18. The method of aligning tower legs of embodiment 17, further comprising: drilling footing holes; hoisting the alignment jig; placing the alignment jig central conical alignment receptacle vertically atop the alignment jig chair conical taper; vertically adjusting the alignment jig elevation by treaded adjustment of the chair threaded section; rotating the alignment jig to a prescribed orientation; attaching a concrete form can, comprising a footing form attachment tab, to each spider arm adjustment attachment tab disposed on each spider arm adjustment; then attaching a load bearing member to each shoe; and pouring concrete in the footing holes; then pouring concrete in the concrete form cans.

19. The method of aligning tower legs of embodiment 18, further comprising: waiting for a time for the concrete in the footing holes and concrete form cans to allow for sufficient hardening of the concrete; retracting the spider arm adjustment into each spider arm; retracting or removing the chords; and then hoisting the alignment jig away for further use.

20. The method of aligning tower legs of embodiment 19, comprising erecting a tower onto the load bearing members.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An alignment jig, comprising:
    a hub;
    a tower removably attached to the hub;
    one or more spider arms, each spider arm comprising a hub end and a shoe end;
    wherein the spider arms are connected to the hub at their respective hub ends; and
    one rope segment forming a tensile connection between the tower and each spider arm.

2. The alignment jig of claim 1, further comprising:
    a spider arm adjustment that attaches to one of the spider arms at the shoe end; and
    a shoe attached to the spider arm adjustment.

3. The alignment jig of claim 2, wherein the spider arm adjustment allows a plurality of overall length adjustments of a shoe to hub distance, thereby allowing for a corresponding plurality of jig placement patterns.

4. The alignment jig of claim 3, further comprising:
    one or more chords with a connection point at each of two chord ends;
    wherein each chord is connected to two shoes by attachment of one connection point to each shoe at both chord ends.

5. The alignment jig of claim 4, wherein there are four spider arms corresponding with four spider arm adjustments.

6. The alignment jig of claim 5, wherein there are four chords.

7. The alignment jig of claim 3, wherein the spider arm adjustments are retractable.

8. The alignment jig of claim 5, wherein the chords are retractable on at least one end.

9. The alignment jig of claim 8, wherein the spider arm adjustments and chords are adjustable to one or more preset lengths.

10. The alignment jig of claim 1, wherein the tensile connection between the tower and each spider arm occurs at a "pad-eye" on the shoe end of the spider arm.

11. The alignment jig of claim 1, further comprising a chair, said chair comprising:
    (a) a chair seat;
    (b) tubular steel members that form a tripod arrangement that join at the chair seat;
    (c) wherein the tubular steel members terminate at a bottom with a chair pad; and
    (d) cross members that interconnect the tubular steel members.

12. The alignment jig of claim 11, wherein the chair further comprises:
    a threaded section that adjustably extends from the chair seat, comprising a conical point atop the threaded section;
    whereby vertical adjustment of the conical point may be allowed.

13. The alignment jig of claim 1, wherein the spider arm comprises:
    a jack arm; and
    a screw jack removably mounted to the jack arm;
    wherein the screw jack has a jack stand.

14. A method of aligning tower legs, comprising:
    (a) providing a survey marker at a surveyed reference location;
    (b) leveling a circular region about the survey marker;
    (c) placing a circular plate about the surveyed marker, the circular plate comprising an opening whereby the surveyed marker may be viewed;
    (d) placing a chair atop the circular plate, the chair comprising three legs joining at a chair seat, a threaded section threadedly disposed on the chair seat, and a conical taper disposed atop the threaded section above the chair seat; and
    (e) providing the alignment jig of claim 1, the alignment jig further comprising a central conical alignment receptacle disposed on a hub, whereby the central conical taper mates with the central taper, whereby the alignment jig may be vertically spaced above the surveyed reference location at a specified elevation, and whereby the alignment jig is centered vertically above the survey marker.

15. The method of aligning tower legs of claim 14, further comprising:
    (f) drilling footing holes;
    (g) hoisting the alignment jig;
    (h) placing the alignment jig central conical alignment receptacle vertically atop the alignment jig chair conical taper;
    (i) vertically adjusting the alignment jig elevation by treaded adjustment of the chair threaded section;
    (j) rotating the alignment jig to a prescribed orientation;
    (k) attaching a concrete form can, comprising a footing form attachment tab, to each spider arm adjustment attachment tab disposed on each spider arm adjustment; then
    (l) attaching a load bearing member to each shoe;
    (m) pouring concrete in the footing holes; and
    (n) pouring concrete in the concrete form cans.

16. The method of aligning tower legs of claim 15, further comprising:
- (o) waiting for a time for the concrete in the footing holes and concrete form cans to allow for sufficient hardening of the concrete;
- (p) retracting the spider arm adjustment into each spider arm;
- (q) retracting or removing the chords; and
- (r) hoisting the alignment jig away for further use.

17. The method of aligning tower legs of claim 16, comprising erecting a tower onto the load bearing members.

18. An alignment jig, comprising:
- (a) a hub;
- (b) four spider arms, each spider arm comprising a hub end and a shoe end, wherein each hub end is removably attached to the hub;
- (c) a spider arm adjustment slidably connected on each spider arm at one or more preset lengths;
- (d) a shoe attached to an end of the spider arm adjustment, wherein the shoe allows for placement of a tower leg;
- (e) four chords, each chord comprising a connection point at each of two different chord ends, wherein the chords are connected to the spider arms by attachment of one connection point to one shoe at each of two different chord ends, and whereby each shoe end is thereby connected to two different chords;
- (f) a tower attached to a top side of the hub;
- (g) at least one rope segment connecting each spider arm to the tower in tension;
- (h) a spider arm adjustment attachment tab disposed on each spider arm adjustment; and
- (i) a footing form attachment tab, removably connected to one spider arm adjustment attachment tab.

19. The alignment jig of claim 18, further comprising:
- (a) a chair comprising three legs joining at a chair seat, a threaded section threadedly disposed on the chair seat, and a conical taper disposed atop the threaded section distal from the chair seat; and
- (b) a central conical alignment receptacle disposed on the hub, whereby the conical taper mates with the central conical alignment receptacle.

20. An alignment jig prepared for shipping, comprising:

a hub;

four spider arms, each spider arm comprising a hub end and a shoe end;

wherein the spider arms are connected to the hub at their respective hub ends;

a spider arm adjustment that attaches to each of the spider arms at the shoe end, wherein the spider arm adjustments are slid as far as possible into the spider arms to minimize overall length; and a shoe attached to the spider arm adjustment;

wherein the shoes of the spider arm adjustments are attached by being folded together two to a side by a shipping strap.

* * * * *